(12) United States Patent
Berit-Debat et al.

(10) Patent No.: US 10,222,511 B2
(45) Date of Patent: Mar. 5, 2019

(54) OPTICAL ARTICLE COMPRISING A DOUBLE-LAYER ABRASION AND SCRATCH RESISTANT COATING AND METHOD FOR PRODUCTION THEREOF

(71) Applicant: ESSILOR INTERNATIONAL (COMPAGNIE GENERALE D'OPTIQUE), Charenton-le-Pont (FR)

(72) Inventors: Fabien Berit-Debat, Castanet-Tolosan (FR); Christian Bovet, Balbins (FR); Jean-Paul Cano, Lauzerville (FR); Amélie Kudla, Paris (FR); Yves Leclaire, Veneux les Sablons (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 155 days.

(21) Appl. No.: 15/264,290

(22) Filed: Sep. 13, 2016

(65) Prior Publication Data

US 2017/0003420 A1 Jan. 5, 2017

Related U.S. Application Data

(63) Continuation of application No. 12/160,587, filed as application No. PCT/FR2007/052383 on Nov. 22, 2007.

(30) Foreign Application Priority Data

Nov. 23, 2006 (FR) ...................................... 06 55085

(51) Int. Cl.
    *C09D 183/04* (2006.01)
    *G02B 1/14* (2015.01)
    *G02B 1/10* (2015.01)
    *B05D 3/02* (2006.01)
    *B05D 7/00* (2006.01)
    *G02C 7/02* (2006.01)

(52) U.S. Cl.
    CPC ............. *G02B 1/14* (2015.01); *B05D 3/0254* (2013.01); *B05D 7/546* (2013.01); *C09D 183/04* (2013.01); *G02B 1/105* (2013.01); *G02C 7/02* (2013.01); *Y10T 428/2495* (2015.01); *Y10T 428/265* (2015.01); *Y10T 428/31511* (2015.04)

(58) Field of Classification Search
    None
    See application file for complete search history.

(56) References Cited

U.S. PATENT DOCUMENTS

| 4,211,823 | A | 7/1980 | Suzuki et al. |
| 4,746,366 | A | 5/1988 | Philipp et al. |
| 5,114,783 | A | 5/1992 | Hodnett, III |
| 5,254,395 | A | 10/1993 | Hodnett, III |

(Continued)

FOREIGN PATENT DOCUMENTS

| FR | 2721720 | 12/1995 |
| JP | 2002160201 | 6/1990 |

(Continued)

*Primary Examiner* — Robert S Loewe
(74) *Attorney, Agent, or Firm* — Norton Rose Fulbright US LLP

(57) ABSTRACT

The invention relates to an optical article comprising a substrate coated with an abrasion and scratch resistant coating composed of a lower layer and an upper layer that do adhere to each other, the upper layer and the lower layer being layers of cured upper and lower layer compositions, said upper layer composition comprising at least one organosilane, or a hydrolyzate thereof, of formula $R_nY_mSi(X)_{4-n-m}$ and at least one compound, or a hydrolyzate thereof, of formula $M(Z)_x$, the following ratio being lower than 2.3:

$$Rs = \frac{\text{theoretical dry matter weight of compounds I in the upper layer composition}}{\text{theoretical dry matter weight of compounds II in the upper layer composition}}$$

said lower layer composition comprising at least one organosilane, or a hydrolyzate thereof, of formula $R'_{n'}Y'_{m'}Si(X')_{4-n'-m'}$, and, optionally, at least one compound, or a hydrolyzate thereof, of formula $M'(Z')_y$, the following ratio being higher than 2.3:

$$Ri = \frac{\text{theoretical dry matter weight of compounds III in the lower layer composition}}{\text{theoretical dry matter extract of compounds IV in the lower layer composition}}$$

In the hereabove formulas, M and M' are metals or metalloids of valences x and y, at least equal to 4, R and R' groups are monovalent organic groups that are bound to silicon through a carbon atom and that contain at least one epoxy function, X, X', Z and Z' groups are hydrolyzable groups, Y and Y' are monovalent organic groups that are bound to silicon through a carbon atom, n, m, n' and m' being integers such that n and n'=1 or 2 with n+m and n'+m'=1 or 2.

34 Claims, No Drawings

(56) References Cited

U.S. PATENT DOCUMENTS

| | | |
|---|---|---|
| 5,916,669 A | 6/1999 | Parker et al. |
| 6,008,285 A | 12/1999 | Kasemann et al. |
| 6,051,310 A | 4/2000 | Cano et al. |
| 6,489,028 B1 | 12/2002 | Degand et al. |
| 6,808,812 B2 | 10/2004 | White et al. |
| 6,855,396 B1 | 2/2005 | Mennig et al. |
| 6,905,772 B2 | 6/2005 | Shoup et al. |
| 2001/0031317 A1 | 10/2001 | Hasegawa et al. |
| 2002/0034630 A1 | 3/2002 | Cano et al. |
| 2003/0165698 A1 | 9/2003 | Vaneeckhoutte et al. |
| 2004/0131793 A1* | 7/2004 | Bier ............... B05D 7/546 427/535 |
| 2004/0131867 A1 | 7/2004 | Bier et al. |
| 2007/0264508 A1 | 11/2007 | Gabelnick et al. |

FOREIGN PATENT DOCUMENTS

| | | |
|---|---|---|
| JP | H02274736 | 11/1990 |
| JP | H0996702 | 4/1997 |
| WO | WO2000/024831 | 5/2000 |
| WO | WO2000/029496 | 5/2000 |

\* cited by examiner

OPTICAL ARTICLE COMPRISING A DOUBLE-LAYER ABRASION AND SCRATCH RESISTANT COATING AND METHOD FOR PRODUCTION THEREOF

This application is a continuation of U.S. patent application Ser. No. 12/160,587, filed Apr. 14, 2010, which is a national phase application under 35 U.S.C. § 371 of International Application No. PCT/FR2007/052383 filed 22 Nov. 2007, which claims priority to French Patent Application No. 0655085 filed on 23 Nov. 2006. The entire text of each of the above-referenced disclosures is specifically incorporated herein by reference without disclaimer.

The present invention relates to an optical article, such as an ophthalmic lens in organic glass, coated with a bilayered coating based in particular on thermosetting polysiloxane compositions which do provide it simultaneously with performances in both abrasion and scratch resistance, closed to those of mineral glass, as well as a method for making such an optical article.

Ophthalmic lenses made of a transparent, organic material, or organic glass, lighter than mineral glass, are nowadays broadly used. However, organic glasses as a drawback suffer from being more sensitive to scratch and abrasion as compared to traditional mineral glasses.

It is usual to coat any ophthalmic lens with various coatings, so as to provide this lens with improved mechanical and/or optical properties. Thus, traditionally, coatings are successively deposited onto an ophthalmic lens, such as impact-resistant coatings, abrasion-resistant coatings and/or scratch-resistant and antireflective coatings.

Abrasion-resistant and/or scratch-resistant coatings used to protect the surface of organic glasses are typically hard monolayered coatings of the poly(meth)acrylic type or based on silane hydrolyzates.

A known method for making abrasion-resistant coatings consists in polymerizing alkoxysilanes in the presence of curing catalysts such as aluminium derivatives. As an illustration of some literature covering such a technique, the U.S. Pat. No. 4,211,823 may be mentioned, that describes compositions comprising a hydrolyzate of a silane having an epoxy moiety and at least two alkoxy moieties directly bound to the silicon atom, silica fine particles, some aluminium chelates, in a solvent medium comprising more than 1% by weight of water, said compositions being used for coating substrates in a plastic material.

The U.S. Pat. No. 5,916,669 describes a bilayered coating which poly(urethane-acrylate) type upper layer is a hard layer, more vulnerable than the lower layer, which is a more flexible layer of acrylate nature. The upper layer is a layer providing a protection against scratching, whereas the lower layer makes it possible to increase the upper layer abrasion resistance without impairing its scratch resistance properties. The patent does mention that combining these two layers makes it possible to obtain simultaneously good abrasion and scratch resistances.

The U.S. Pat. No. 5,254,395 and U.S. Pat. No. 5,114,783 also describe bilayered abrasion-resistant and scratch-resistant coatings, comprising a hard, highly cross-linked acrylic copolymer-based upper layer, bonded to a flexible lower layer formed from a mixture consisting in a cross-linked, aliphatic urethane and acrylate copolymer and in a small amount of a multifunctional acrylic monomer.

The U.S. Pat. No. 6,808,812 describes a composition for an abrasion-resistant or scratch-resistant coating, comprising the reaction product of oxalic acid with an organometallic derivative, preferably a titanate such as tetra-isopropoxytitanium, an epoxyalkoxysilane such as γ-glycidoxypropyl trimethoxysilane (GLYMO) and optionally a second alkoxysilane such as dimethyl diethoxysilane (DMDES).

According to an embodiment described in this patent, this composition may be deposited onto a substrate already coated with an abrasion-resistant coating of (meth)acrylic or polysiloxane nature, for example based on an epoxyalkoxysilane and colloidal silica hydrolyzate. Such a bilayered coating offers an excellent combination of abrasion and scratch resistance properties.

The French patent FR 2721720 discloses a bilayered coating comprising an upper layer consisting in an impact-resistant primer of the polysiloxane type (methyl-GLYMO or GLYMO) and an abrasion-resistant lower layer also of the polysiloxane type, comprising a methyl-GLYMO (γ-glycidoxypropylmethyl dimethoxysilane) matrix wherein colloidal silica is dispersed.

There is a need to improve the scratch-resistance properties of such coatings.

It is therefore an object of the present invention to provide a transparent optical article, particularly an ophthalmic lens, comprising a substrate in mineral or organic glass and a coating providing it with significantly improved scratch resistance and abrasion resistance properties, wherein obtaining either one of both properties should not be detrimental to the other, and this even when said coating is combined with an antireflective coating.

It is also an object of the present invention to provide a scratch-resistant and abrasion-resistant coating such as hereabove, that does not make vulnerable the substrate onto which it is deposited. The scratch-resistant and abrasion-resistant coating must have the transparency required for being applicable to the optics field, as well as a good adhesion to the substrates, particularly those made of an organic material. Moreover, the layers forming it must possess a good adhesion to each other.

It is a further object of the present invention to provide a method for making such optical articles, which may be easily integrated into the usual production process for optical articles.

The hereabove determined objectives are aimed at according to the invention by an optical article comprising a substrate having at least one main surface coated with an abrasion- and scratch-resistant coating, said coating being composed, starting from the substrate, of a lower layer and an upper layer that do adhere with each other, the upper layer being a layer of a cured upper layer composition and the lower layer being a layer of a cured lower layer composition, said upper layer composition comprising:

at least one organosilane compound, or a hydrolyzate thereof, of formula:

$$R_nY_mSi(X)_{4-n-m} \quad \quad (I)$$

wherein the R groups, being the same or different, are monovalent organic groups that are bound to silicon through a carbon atom and that contain at least one epoxy function, the X groups, being the same or different, are hydrolyzable groups, Y is a monovalent organic group bound to silicon through a carbon atom, n and m being integers such that n=1 or 2 with n+m=1 or 2, and at least one compound, or a hydrolyzate thereof, of formula:

$$M(Z)_x \quad \quad (II)$$

wherein M represents a metal or a metalloid, the Z groups, being the same or different, are hydrolyzable groups and x, equal to or higher than 4, is the metal or metalloid M valence, the ratio:

$$Rs = \frac{\text{theoretical dry matter weight of compounds I in the upper layer composition}}{\text{theoretical dry matter weight of compounds II in the upper layer composition}}$$

being lower than or equal to 2.3, and said lower layer composition comprising:
at least one organosilane compound, or a hydrolyzate thereof, of formula:

$$R'_{n'}Y'_{m'}Si(X')_{4-n'-m'} \quad \text{(III)}$$

wherein the R' groups, being the same or different, are monovalent organic groups that are bound to silicon through a carbon atom and that contain at least one epoxy function, the X' groups, being the same or different, are hydrolyzable groups, Y' is a monovalent organic group bound to silicon through a carbon atom, n' and m' being integers such that n'=1 or 2 with n'+m'=1 or 2, and
optionally, at least one compound, or a hydrolyzate thereof, of formula:

$$M'(Z')_y \quad \text{(IV)}$$

wherein M' represents a metal or a metalloid, the Z' groups, being the same or different, are hydrolyzable groups and y, equal to or higher than 4, is the metal or metalloid M' valence, the ratio:

$$Ri = \frac{\text{theoretical dry matter weight of compounds III in the lower layer composition}}{\text{theoretical dry matter weight of compounds IV in the lower layer composition}}$$

being higher than 2.3.

In the present application, when an optical article comprises one or more coating(s) on its surface, "depositing a layer or a coating onto the article" means that a layer or a coating has been deposited on the exposed surface of the article external coating, that is to say on its coating that is the most distant from the substrate.

A coating that is "on" a substrate or that has been deposited "onto" a substrate is defined as being a coating (i) that is positioned above the substrate, (ii) that is not necessarily in contact with the substrate, which means that one or more intermediate coating(s) may be arranged between the substrate and the coating of interest, and (iii) that does not necessarily totally cover the substrate.

The optical article of the invention comprises a substrate, preferably a transparent substrate, in organic or mineral glass, having front and rear main faces, at least one of said main faces bearing a bilayered scratch-resistant and abrasion-resistant coating, preferably both main faces. Throughout the following application, the abrasion- and scratch-resistant coating of the invention will typically be simply called "abrasion-resistant coating" or "bilayered coating."

Generally speaking, the abrasion-resistant coating of the optical article of the invention may be deposited onto any substrate, and preferably organic glass substrates, for example a thermoplastic or thermosetting plastic material.

Thermoplastic materials suitable for substrates encompass (meth)acrylic (co)polymers, in particular methyl poly (methacrylate) (PMMA), thio(meth)acrylic (co)polymers, polyvinyl butyral (PVB), polycarbonates (PC), polyurethanes (PU), poly(thiourethanes), polyol allylcarbonate (co) polymers, thermoplastic copolymers of ethylene and vinyl acetate, polyesters such as polyethylene terephthalate (PET) or polybutylene terephthalate (PBT), polyepisulfides, polyepoxides, copolymers of polycarbonates and polyesters, copolymers of cycloolefins such as copolymers of ethylene and norbornene or ethylene and cyclopentadiene, and combinations thereof.

As used herein, a "(co)polymer" means either a copolymer or a polymer. A "(meth)acrylate" means either an acrylate or a methacrylate.

According to the invention, preferred substrates may include substrates obtained by polymerizing alkyl (metha) crylates, in particular $C_1$-$C_4$ alkyl (meth)acrylates, such as methyl (meth)acrylate and ethyl (meth)acrylate, aromatic polyethoxylated (meth)acrylates such as polyethoxylated bisphenol di(meth)acrylates, allyl derivatives such as allyl carbonates of aliphatic or aromatic, linear or branched polyols, thio(meth)acrylates, episulfides and polythiol and polyisocyanate based precursor mixtures (for producing polythiourethans).

As used herein, a "polycarbonate" (PC) means equally homopolycarbonates and copolycarbonates and block copolycarbonates. Polycarbonates are commercially available and are marketed for example by GENERAL ELECTRIC COMPANY under the trade name LEXAN®, by TEIJIN under the trade name PANLITE®, by BAYER under the trade name BAYBLEND®, by MOBAY CHEMICHAL Corp. under the trade name MAKROLON® and by DOW CHEMICAL Co. under the trade name CALIBRE®.

Suitable examples of (co)polymers of polyol allyl carbonates encompass (co)polymers of ethylene glycol bis (allyl carbonate), of diethylene glycol bis 2-methyl carbonate, of diethylene glycol bis (allyl carbonate), of ethylene glycol bis (2-chloro allyl carbonate), of triethylene glycol bis (allyl carbonate), of 1,3-propanediol bis (allyl carbonate), of propylene glycol bis (2-ethyl allyl carbonate), of 1,3-butenediol bis (allyl carbonate), of 1,4-butenediol bis (2-bromo allyl carbonate), of dipropylene glycol bis (allyl carbonate), of trimethylene glycol bis (2-ethyl allyl carbonate), of pentamethylene glycol bis (allyl carbonate), of isopropylene bisphenol A bis (allyl carbonate).

Particularly recommended substrates are those substrates obtained by (co)polymerizing diethylene glycol bis allyl carbonate marketed, for example, under the trade name CR-39® by PPG Industries (ORMA® lenses, by ESSILOR).

Particularly recommended substrates also encompass those substrates obtained by polymerizing thio(meth)acrylic monomers, such as those described in the French patent application FR 2734827.

Naturally, the substrates may be obtained by polymerizing mixtures from the previously mentioned monomers, or they may also comprise mixtures of these polymers and (co) polymers.

According to an embodiment of the invention, the substrate comprises a front face and a rear face, and the abrasion-resistant coating may be applied on at least one of said faces. It is preferably applied on the front and rear faces of the substrate.

As used herein, the "rear face" (typically concave) of the substrate means the face which during the use of the article stands the nearest to the wearer's eye. On the contrary, the "front face" (typically convex) of the substrate means the face which during the use of the article is the most distant from the wearer's eye.

Prior to depositing the abrasion-resistant coating onto the substrate that has been optionally already coated, for example with an impact-resistant primer layer, it is usual to expose the optionally coated surface of said substrate to a treatment for reinforcing the adhesion of the abrasion-resistant lower layer, that is typically conducted under vacuum, such as a bombardment with energetic species, for example with an ion beam ("Ion Pre-Cleaning" or "IPC"), a corona discharge treatment, by ion spallation or plasma treatment under vacuum. Thanks to these cleaning treatments, the substrate surface cleanliness is optimized. The ion bombardment treatment is preferred, using preferably argon, oxygen or mixtures thereof as the ionizing gas, under an accelerating voltage typically ranging from 50 to 200 V.

As used herein, "energetic species" means species which energy ranges from 1 to 150 eV, preferably from 10 to 150 eV, and more preferably from 40 to 150 eV. The energetic species may be chemical species such as ions, radicals or species like photons or electrons.

An acidic or a basic chemical surface pre-treatment may also be conducted, or using a solvent or a mixture of solvents.

According to the present invention, the bilayered scratch-resistant and abrasion-resistant coating may be deposited directly onto a bare substrate. In some applications, it is preferred the substrate main surface be coated with one or more functional coating(s) prior to depositing the abrasion-resistant coating of the invention. These functional coatings may be, without limitation, an impact-resistant primer layer, a polarized coating, a photochromic coating, an antistatic coating, an additional abrasion-resistant and/or scratch-resistant coating or a coloured coating.

The abrasion-resistant bilayered coating of the invention is preferably deposited onto a bare substrate, onto a substrate coated with an additional abrasion-resistant and/or scratch-resistant coating which has preferably a single layer, or onto a substrate coated with a primer layer improving the impact resistance and/or the adhesion of the following layers in the final product.

Such coating may be any impact-resistant primer layer traditionally used for articles made of a transparent polymer material, such as ophthalmic lenses.

As preferred primer compositions, compositions may be mentioned, that are based on thermoplastic polyurethanes, such as those described in the Japanese patents JP 63-141001 and JP 63-87223, poly(meth)acrylic primer compositions, such as those described in the U.S. Pat. No. 5,015,523, compositions based on thermosetting polyurethanes, such as those described in the European patent EP 0404111 and compositions based on poly(meth)acrylic latex or polyurethane type latex, such as those described in the U.S. Pat. No. 5,316,791 and EP 0680492.

Preferred primer compositions are those compositions based on polyurethanes and those compositions based on latex, in particular polyurethane type latex.

Poly(meth)acrylic latices are copolymer latices mainly consisting in a (meth)acrylate, such as for example ethyl, butyl, methoxyethyl or ethoxyethyl (meth)acrylate, with a typically minor content of at least one other co-monomer, such as for example styrene.

Preferred poly(meth)acrylic latices are copolymer latices of acrylate and styrene. Such copolymer latices of acrylate and styrene are commercially available from ZENECA RESINS under the trade name NEOCRYL®.

Polyurethane latices are also known and commercially available. As an example, polyurethane latices containing polyester units may be mentioned. Such latices are also marketed by ZENECA RESINS under the trade name NEOREZ® and by BAXENDEN CHEMICALS under the trade name WITCOBOND®.

Commercial primer compositions to be suitably used in the present invention include Witcobond® 232, Witcobond® 234, Witcobond® 240, Witcobond® 242, Neorez® R-962, Neorez® R-972, Neorez® R-986 and Neorez® R-9603 compositions.

Mixtures of such latices may also be used in the primer compositions, in particular mixtures of polyurethane latex and poly(meth)acrylic latex.

The primer composition preferably comprises fillers, that are typically nanoparticles, so as to increase the hardness and/or the refractive index of the cured coating, and also to prevent any possible diffusion of the layer just deposited onto the primer. Such nanoparticles may be organic or inorganic in nature. A mixture of organic and inorganic nanoparticles may also be used.

Inorganic nanoparticles are preferably used, and in particular nanoparticles of the metal oxide or metalloid, nitride or fluoride type, or mixtures thereof.

Examples of nanoparticles that are suitably used in the invention include nanoparticles of the following compounds: $SiO_2$, $Al_2O_3$, $ZrO_2$, $TiO_2$, $Sb_2O_5$, $Ta_2O_5$, $ZnO_2$, tin oxide, indium oxide, cerium oxide, $WO_3$, $Y_2O_3$, and mixtures thereof.

Fillers are preferably used in the colloidal form, that is to say in the form of fine particles, which diameter (or the longest side) is lower than 1 μm, preferably lower than 150 nm, more preferably lower than 100 nm, even more preferably comprised from 10 to 80 nm, dispersed in a dispersing medium such as water, an alcohol, a ketone, an ester or mixtures thereof, preferably an alcohol.

Fillers are preferably high refractive index colloids (or precursors thereof), that is to say colloids consisting in a material which refractive index is higher than 1.55. Fillers may in particular be $TiO_2$, $ZrO_2$, $Sb_2O_5$, $SnO_2$, $WO_3$, $Al_2O_3$, $Y_2O_3$, $Ta_2O_5$ colloids and mixtures thereof. The primer composition preferably comprises from 5% to 65%, preferably from 5 to 50% by weight of fillers.

Fillers may also be composite particles, preferably composite particle colloids, for example based on following oxides: $SiO_2/TiO_2$, $SiO_2/ZrO_2$, $SiO_2/TiO_2/ZrO_2$, $TiO_2/SiO_2/ZrO_2/SnO_2$. Such composite particle colloids are available from the Catalysts and Chemical Company.

Particularly recommended composite particles are described in the patents EP 730168, JP 11310755, JP 200204301 and JP 2002363442.

Such primer compositions may be deposited onto the article faces by dip coating or by spin coating, then are dried at a temperature of at least 70° C. and up to 100° C., preferably of about 90° C., for a time period ranging from 2 minutes to 2 hours, typically of about 15 minutes, to form primer layers which once cured are from 0.2 to 2.5 μm, preferably from 0.5 to 1.5 μm thick.

The optional abrasion-resistant and/or scratch-resistant coating onto which the bilayered scratch-resistant and abrasion-resistant coating of the invention may be deposited will be typically called "additional abrasion-resistant and/or scratch-resistant coating." This additional abrasion-resistant and/or scratch-resistant coating is preferably a monolayered coating.

It may be formed with any layer traditionally used as an abrasion-resistant and/or scratch-resistant coating in the field of ophthalmic lenses. It is preferably a hard coating based on poly(meth)acrylates or silicones comprising typically one or more mineral filler(s) that are intended to increase the hardness and/or the refractive index of the coating once cured. Additional abrasion-resistant and/or scratch-resistant hard coatings recommended according to the present invention include for example coatings obtained from compositions comprising at least one silane, preferably one alkoxysilane and/or one hydrolyzate thereof, obtained for example by hydrolyzing with a hydrochloric acid solution and optionally with condensing and/or curing catalysts.

The additional abrasion-resistant and/or scratch-resistant coatings preferred in the present invention are coatings based on epoxysilane hydrolyzates, in particular those described in the French patent application FR 2702486 and in the U.S. Pat. No. 4,211,823 and U.S. Pat. No. 5,015,523, or coatings based on poly(meth)acrylates such as those described in the international application WO 2007/051841.

The additional abrasion-resistant and/or scratch-resistant coating composition may be deposited onto the substrate main face by dip coating or by spin coating. It is then cured using the suitable mode (preferably a thermal mode, or using ultraviolet radiation).

In the final optical article, the thickness of this additional abrasion-resistant and/or scratch-resistant coating does typically vary from 2 to 10 µm, preferably from 2 to 5 µm.

The abrasion- and scratch-resistant coating of the invention does consist in two adjacent layers having different characteristics and strongly adhering to each other. The compositions for preparing these two layers, the composition of the abrasion-resistant upper layer and the composition of the abrasion-resistant lower layer are formulated so that said coating has a hardness gradient, the upper layer being harder than the lower layer.

As used herein, the "abrasion-resistant coating upper layer", which will be simply called "upper layer," means the abrasion-resistant coating layer that is the most distant from the substrate.

As used herein, the abrasion-resistant coating lower layer, which will be simply called "lower layer," means the abrasion-resistant coating layer that is the nearest to the substrate.

Both abrasion-resistant coating compositions of the invention are thermosetting compositions which, after having been applied onto a substrate main surface of the optical article, and once cured, do result in a bilayered scratch-resistant and abrasion-resistant coating, preferably of the polysiloxane type.

The upper layer composition necessarily comprises a cross-linking agent of formula II, whereas the presence of a cross-linking agent of formula IV is only optional in the lower layer composition. Its amount is intentionally limited so as to obtain a lower layer that is more flexible as compared to the upper layer which in turn does possess a higher hardness because of its higher crosslinking rate.

In the present application, the characteristics and preferences stated as regards compounds of formulas I to IV also apply to their hydrolyzates.

Epoxysilane compounds of formulas I and III will be first described simultaneously. Of course, the nature of compound I present in the upper layer and that of compound III present in the lower layer are independent from each other. This means, for example, that the values for n and m integers are independent from those of n' and m' integers.

Compounds of formulas I or III do comprise two or three X or X' hydrolyzable groups directly bound to the silicon atom, each leading to an OH group after hydrolysis, one or two monovalent organic R or R' groups that are bound to silicon with a carbon atom and that contain at least one epoxy function, and zero or one organic monovalent Y or Y' group (m and m'=0 or 1). It should be noted that Si—OH functions may initially be present in compounds of formulas I or III, and if so, they are considered as being hydrolyzates.

n et m integers such as defined hereabove do define three classes of compounds I. Compounds of formula $RYSi(X)_2$, compounds of formula $R_2Si(X)_2$, and lastly compounds of formula $RSi(X)_3$. Amongst them, epoxysilanes of formula $RSi(X)_3$, which comprise three hydrolyzable groups bound to the silicon atom, are preferred. The same conclusions apply to compounds of formula III defined by n' and m' integers.

X or X' hydrolyzable groups may represent, independently from each other and without limitation, —O—$R^1$ alkoxy groups, wherein $R^1$ is preferably a linear or branched, alkyl group, preferably a $C_1$-$C_4$ alkyl group, or an alkoxyalkyl group, —O—C(O)$R^3$ acyloxy groups, wherein $R^3$ is an alkyl group, preferably a $C_1$-$C_6$ alkyl group, preferably a methyl or an ethyl group, halogens such as Cl and Br, amino groups optionally substituted with one or two functional group(s) such as an alkyl or a silane group, for example a —NHSiMe$_3$ group.

Preferably, X or X' groups are alkoxy groups, and in particular methoxy, ethoxy, propoxy or butoxy groups, more preferably methoxy or ethoxy groups, thus making the compounds of formulas I or III defined as epoxyalkoxysilanes.

Monovalent R or R' groups that are bound to silicon with a carbon atom are organic groups as they do contain at least one epoxy function, preferably only one epoxy function.

As used herein, an "epoxy function" means a group of atoms wherein an oxygen atom is directly bound to two adjacent or non adjacent carbon atoms in a carbon chain or in a cyclic carbon system. Amongst the epoxy functions, oxirane functions are preferred, that is to say three-membered, saturated, cyclic ether groups.

Preferred R or R' groups do correspond to following formulas V and VI:

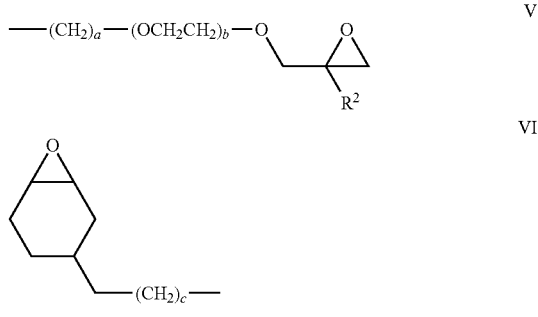

wherein $R^2$ is an alkyl group, preferably a methyl group, or a hydrogen atom, most preferably a hydrogen atom, a and c are integers ranging from 1 to 6, and b is 0, 1 or 2.

The preferred group of formula V is the γ-glycidoxypropyl group ($R^2$=H, a=3, b=0) and the preferred (3,4-epoxycyclohexyl)alkyl group of formula VI is the β-(3,4-epoxycyclohexyl)ethyl group (c=1). The γ-glycidoxyethoxypropyl group may also be used ($R^2$=H, a=3, b=1).

The preferred epoxysilanes of formula I or III are epoxyalkoxysilanes comprising preferably one R or R' group and three alkoxy groups, the latter being directly bound to the silicon atom. Particularly preferred epoxytrialkoxysilanes do correspond to following formulas VII and VIII:

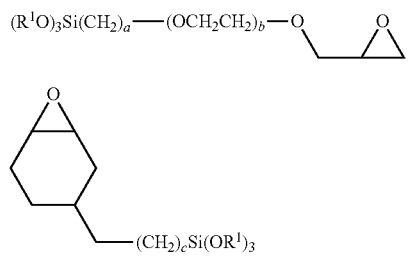

VII

VIII wherein $R^1$ is an alkyl moiety having from 1 to 6 carbon atoms, preferably a methyl or an ethyl moiety, and a, b and c are such as defined hereabove.

Examples of such epoxysilanes encompass γ-glycidoxypropyl triethoxysilane, γ-glycidoxypropyl trimethoxysilane, 2-(3,4-epoxycyclohexyl) ethyltrimethoxysilane, 2-(3,4-epoxycyclohexyl) ethyltriethoxysilane. Other suitable examples of useful epoxytrialkoxysilanes are given in the U.S. Pat. No. 4,294,950. Amongst them, γ-glycidoxypropyl trimethoxysilane (GLYMO) is the most preferred.

Epoxysilanes I or III may optionally comprise a monovalent organic Y or Y' group, directly bound to the silicon atom through a Si—C linkage. These groups may be hydrocarbon groups, saturated or not, preferably $C_1$-$C_{10}$ and more preferably $C_1$-$C_4$ groups, for example an alkyl group, preferably a $C_1$-$C_4$ alkyl group, such as a methyl or an ethyl group, an alkenyl group such as a vinyl group, a $C_6$-$C_{10}$ aryl group, for example a phenyl group, optionally substituted, particularly by one or more $C_1$-$C_4$ alkyl group(s), a (meth)acryloxyalkyl group, or they may represent the fluorinated or perfluorinated analog groups of the hereabove mentioned hydrocarbon groups, for example fluoroalkyl or perfluoroalkyl groups, or (poly)fluoro or perfluoro alkoxy[(poly)alkylenoxy]alkyl groups.

Y (or Y') groups preferably do not comprise any function that might react with the hydrolyzed silanes present in the upper (or lower) layer composition, and particularly with the SiOH and/or epoxy moieties of these silanes. Most preferably, Y (or Y') represents an alkyl group, preferably a $C_1$-$C_4$ alkyl group, and more preferably a methyl group.

Preferred epoxysilanes I or III comprising a Y or Y' group are epoxydialkoxysilanes such as γ-glycidoxypropyl (methyl) dimethoxysilane, γ-glycidoxypropyl(methyl) diethoxysilane and γ-glycidoxyethoxypropyl(methyl) dimethoxysilane. When used, epoxydialkoxysilanes are preferably combined with epoxytrialkoxysilanes such as those described hereabove, and are then preferably used in lower amounts as compared to said epoxytrialkoxysilanes.

Compounds of formulas II and IV will now be described simultaneously. Naturally, the nature of compound II present in the upper layer and that of compound IV present in the lower layer are independent. This means, for example, that the nature of the Z groups is independent from that of the Z' groups.

Z or Z' groups are hydrolyzable groups that may be selected, independently from each other, from the hydrolyzable groups that were previously mentioned for the description of X and X' groups. It should be noted that M-OH or M'-OH functions may be initially present in compounds of formulas II or IV, and if so, they are considered as being hydrolyzates.

M and M' represent, independently from each other, metals or metalloids, which respective valences x or y are equal to or higher than 4, and do typically vary from 4 to 6. They are preferably tetravalent or pentavalent. Preferably, compounds II or IV are tetravalent species (x=4. y=4). M or M' represents atoms selected for example from metals such as Sn, transition metals such as Zr, Hf, Nb, Cr, Ta, W or Ti or metalloids such as silicon or germanium. The antimony in its pentavalent form is also suitable. M or M' preferably corresponds to silicon, zirconium, aluminium or titanium, most preferably silicon.

Thus, preferred compound II is a compound of formula $Si(Z)_4$, wherein the Z groups, being the same or different, are hydrolyzable groups, and preferred compound IV is a compound of formula $Si(Z')_4$, wherein Z' groups, being the same or different, are hydrolyzable groups.

Amongst those compounds, preferred compounds II or IV are tetraalkyl orthosilicates (or tetraalkoxysilane). Tetraethoxysilane (or tetraethyl orthosilicate) $Si(OC_2H_5)_4$ noted TEOS, is advantageously employed, as well as tetramethoxysilane $Si(OCH_3)_4$ noted TMOS, tetra(n-propoxy)silane, tetra(i-propoxy)silane, tetra(n-butoxy)silane, tetra(sec-butoxy)silane or tetra(t-butoxy)silane, and preferably TEOS.

Surprisingly, the inventors discovered that using a silica matrix precursor such as TEOS was better than using colloidal silica, which will clearly appear hereafter in the description of the examples. Coatings based on a composition comprising a mixture of epoxyalkoxysilane and colloidal silica, broadly used in the previous art, do result in coatings which performances as regards abrasion and/or scratch resistance, especially abrasion resistance, are lower than those of the abrasion-resistant coatings according to the invention.

In the upper layer or lower layer compositions of the invention, compounds I to IV may be either partially or totally hydrolyzed. Advantageously, they are totally hydrolyzed. It is preferred for hydrolyzing to use an at least stoichiometric amount of water, that is to say a molar amount of water corresponding at least to the mole number of hydrolyzable groups.

Hydrolyzates are prepared in a way that is known per se. The methods illustrated in the patents FR 2702486 and U.S. Pat. No. 4,211,823 may in particular be employed.

Hydrolyzates of compounds I to IV may be prepared by adding water to the compositions or an organic solvent or a mixture of water and organic solvent, and preferably a catalyst for hydrolyzing the X, X', Z or Z' groups, such as a mineral acid, typically an aqueous solution of hydrochloric, sulfuric, nitric or phosphoric acid or an organic acid organic such as acetic acid, preferably HCl or $H_3PO_4$.

Organic solvents or the mixture of organic solvents suitably used for the hydrolysis step are preferably polar solvents, particularly alkanols such as methanol, ethanol, isopropanol, isobutanol, n-butanol, propylene glycol methyl ethers and mixtures thereof. Other solvents may be used, for example ketones such as acetone, ethers such as tetrahydrofurane or 1,4-dioxane, acetonitrile, aromatic solvents such as toluene or xylene or alkyl chlorides. Methanol is the most preferred organic solvent.

The compositions of the abrasion-resistant coating according to the invention comprise, after hydrolysis, preferably at least 1% by weight of water as related to the weight of said composition. This water may result from the partial hydrolysis of the initial silanes, from the condensation reaction of the silanols formed during this hydrolysis or from using an excessive amount of water.

After the step for hydrolyzing the precursor compounds I to IV, which does typically last for 1 h to 24 h, preferably 2 h to 6 h, at least one condensation catalyst and/or at least one curing catalyst may optionally be added to the compositions of the lower and/or higher abrasion-resistant layer so as to reduce the temperature and the condensation and curing times. Many examples of useful condensation and/or curing catalysts are given in the following literature "Chemistry and Technology of the Epoxy Resins", B. Ellis (Ed.) Chapman Hall, New York, 1993 and "Epoxy Resins Chemistry and Technology" 2d Ed., C. A. May (Ed.), Marcel Dekker, New York, 1988.

As useful condensation catalysts for the hydrolyzed compounds I to IV, polyfunctional, saturated or unsaturated acids or acid anhydrides may be mentioned. As used herein, a "polyfunctional acid or acid anhydride" means an acid or an acid anhydride comprising several acid or acid anhydride functions. There are preferably compounds of carboxylic nature, including for example maleic, chloromaleic, fumaric, itaconic, citraconic, tetrahydrophthalic, trimellitic, oxalic, chlorendic (1,4,5,6,7,7-hexachlorobicyclo[2.2.1]-hept-5-ene-2,3-dicarboxylic acid) acids and maleic, itaconic, phthalic, hexahydrophthalic, hexahydro-4-methylphthalic, tetrachlorophthalic, citraconic, 1,2-trimellitic (1,2,4-benzenetricarboxylic), 1,2-cyclohexane dicarboxylic, bicyclo[2.2.1]hept-5-ene-2,3-dicarboxylic, methylbicyclo[2.2.1]hept-5-ene-2,3-dicarboxylic, bicyclo[2.2.1]hept-5-ene-2,3-dicarboxylic, dodecenylsuccinic, dichloromaleic anhydrides, pyromellitic dianhydride, and mixtures thereof. Non carboxylic acids or anhydrides such as vanadic anhydride may also be used. Preferred condensation catalysts are maleic acid, itaconic acid, trimellitic acid and trimellitic anhydride.

Curing catalysts do particularly act on the polymerization of the epoxy functions and do favour the action of the condensation catalysts. The compounds that can be employed encompass the imidazole derivatives and their imidazolium salts, N-cyanoguanidine ($H_2NC(=NH)NHCN$, cyanamide dimer), also known under the name dicyandiamide, acetylacetone metallic salts of formula $M(CH_3COCHCOCH_3)_n$, wherein M is a metallic ion, preferably $Zn^{2+}$, $Co^{3+}$, $Fe^{3+}$ or $Cr^{3+}$, and n is an integer ranging typically from 1 to 3, preferably corresponding to the metal M oxidation level, ammonium tetrathiocyanatodiamine chromate(III) $NH_4[Cr(SCN)_4(NH_3)_2]$, also known under the name Reinecke salt, compounds based on aluminium, metal-based carboxylates such as zinc, titanium, zirconium, tin or magnesium, for example zinc octoate or stannous octoate, iodonium salts such as hexafluoroantimonates and diaryliodonium tetrakis(pentafluorophenyl)borate, sulfonium salts such as triarylsulfonium hexafluorophosphates and hexafluoroantimonates, and mixtures thereof.

Non limitative examples of imidazole derivatives that may be used as curing catalysts are 2-alkyl imidazoles such as 2-methyl imidazole, 2-phenyl-4-methyl imidazole or 2-propyl-4-methyl imidazole, 1-cyanoalkyl imidazoles such as 1-cyanoethyl-2-methyl imidazole, 1-cyanoethyl-2,4-dimethyl imidazole or 1-cyanoethyl-2-phenyl-4,5-dicyanoethoxymethyl imidazole, and 5-hydroxyalkyl imidazoles such as 2-phenyl-4-methyl-5-hydroxymethyl imidazole or 2-phenyl-4,5-dihydroxymethyl imidazole. Other examples of such compounds are given in the U.S. Pat. No. 4,294,950.

Non limitative examples of aluminium-based compounds that may be used as curing catalysts are aluminium chelates and aluminium(III) acylates and alcoholates of preferred general formulas $Al(OC(O)R)_n(OR')_{3-n}$ and $Al(OSiR''_3)_n(OR')_{3-n}$, wherein R and R' are linear or branched chain alkyl groups containing from 1 to 10 carbon atoms, R" is a linear or branched chain, alkyl group containing from 1 to 10 carbon atoms, a phenyl moiety, an acylate moiety of formula OC(O)R, wherein R is as defined hereabove, and n is an integer from 1 to 3. Preferably, R' is an isopropyl or ethyl group, R and R" are methyl groups.

Aluminium chelates may be formed by reacting an aluminium alcoholate or acylate with chelating agents free from nitrogen or sulfur, comprising oxygen as a coordinating atom, for example acetylacetone, ethyl acetoacetate or diethyl malonate. They may be chosen from aluminium acetylacetonate noted $Al(acac)_3$, ethyl mono(acetoacetate) aluminium bisacetylacetonate, ethyl bis(acetoacetate) aluminium monoacetyl acetonate, di-n-butoxy aluminium ethyl mono(acetoacetate) and di-i-propoxy aluminium ethyl mono(acetoacetate). Other examples of such compounds are given in the patent EP 0614957. When the curing catalyst is an aluminium chelate, the coating composition preferably comprises an organic solvent which boiling temperature at the atmospheric pressure does range from 70 to 140° C., for example ethanol, isopropanol, ethyl acetate, methylethylketone or the tetrahydropyrane.

Preferably, a combination of itaconic acid and N-cyanoguanidine or an aluminium chelate such as aluminium acetylacetonate is used as a catalytic system in the abrasion-resistant coating compositions of the invention. Abrasion-resistant coating compositions comprising a mixture of compounds I/II or III/IV, for example the upper layer compositions, or the lower layer compositions, preferably comprise a combination of itaconic acid and N-cyanoguanidine as a catalytic system.

Without wishing to be bound by any theory, the inventors think that beyond a certain amount of II or IV type crosslinking agents, using a catalytic system as active as an aluminium chelate leads to a cured layer with an excessively high crosslinking rate.

It is thus preferred that the lower layer compositions comprising more than 10% by weight of compounds IV as related to the composition weight, do not comprise any aluminium chelate.

Curing and condensation catalysts are used in usual amounts in order to obtain the condensation and the hardening of the compositions of the invention within a time period of about a few hours at temperatures of about 100° C. Curing catalysts are typically used in an amount ranging from 0 to 5% by weight as related to the total weight of the upper (or lower) layer composition, preferably from 0.1 to 3%. Condensation catalysts are typically used in an amount ranging from 0 to 10% by weight as related to the total weight of the upper (or lower) layer composition, preferably from 0 to 8%.

Both abrasion-resistant coating compositions of the invention may contain additives traditionally used in the abrasion-resistant and/or scratch-resistant coating compositions, such as surfactants which improve the deposition optical quality, preferably fluorine or silicone type surfactants, stabilizers, for example additives to extend the shelf life of the compositions such as chelating agents of the β-diketone or β-ketoester type, as for example acetylacetone or ethyl acetoacetate, fillers, pigments, dyes, UV absorbers, antioxidants, additional crosslinking agents and optionally photo-initiators if the compositions do contain photopolymerizable compounds.

The upper or lower layer compositions of the invention may contain fillers in a small amount, typically one or more mineral filler(s) that are intended to increase the hardness and/or the refractive index of the coating once cured.

Mineral fillers may be selected from metal or metalloid oxides or fluorides such as Si, Sb, Ti, Ta, Zr, Al, Ce, Sn, In, W and mixtures thereof, preferably silica, titanium dioxide, $Sb_2O_5$, $ZrO_2$, $Al_2O_3$ and/or mixed oxides such as $TiO_2/ZrO_2$, $TiO_2/ZrO_2/SiO_2$ and $TiO_2/Fe_2O_3$ (composite particles of these oxides). Preferably, mineral fillers are used in a colloidal form, that is to say in the form of fine particles which diameter (or the longest side) is preferably lower than 1 μm, more preferably lower than 150 nm and even more preferably lower than 100 nm, dispersed in a dispersing medium, such as water, an alcohol, a ketone, an ester or mixtures thereof, preferably an alcohol. Colloidal silica is a suitable example of such a filler, for example the silica from Nissan Sun Colloid Mast which comprises 30% by weight of $SiO_2$ as a solid matter suspended in methanol.

According to a preferred embodiment, the upper layer composition and/or the lower layer composition of the invention comprises less than 10% by weight of fillers (solids) as related to the total weight of the composition, more preferably is free from any filler. In particular, it is preferred that the upper layer composition and/or the lower layer composition of the invention comprises less than 10% by weight of colloidal silica as related to the total weight of the composition, more preferably is free from any colloidal silica.

Preferably, the filler total weight present in the upper layer composition and/or the lower layer composition, in other words the theoretical dry matter weight of fillers represents less than 30% of the theoretical dry matter weight of the composition, more preferably less than 20% and even more preferably less than 10%. Such preferences do also apply to the colloidal silica theoretical dry matter weight.

As used herein, the "theoretical dry matter weight of a composition component" means the theoretical weight of solids represented by this component in said composition, that is to say its weight contribution to the theoretical dry matter weight of the composition.

The theoretical dry matter weight of a composition is defined as being the sum of all component theoretical dry matter weights.

In the present context, the "theoretical dry matter weight of component I, II, III or IV" means:

for compounds I and III, the weight of said compounds as calculated in $R_n$ $Y_m$ $Si(O)_{(4-n-m)/2}$ or $R'_{n'}$ $Y'_{m'}$ $Si(O)_{(4-n'-m')/2}$ units, wherein R, Y, n, m, R', Y', n' and m' are such as previously defined;

for compounds II and IV, the weight of said compounds as calculated in $M(O)_{x/2}$ or $M'(O)_{y/2}$ units, wherein M, M', x and y are such as previously defined.

The theoretical dry matter weight of component I, II, III or IV is lower than the weight of component I, II, III or IV actually used. The theoretical dry matter weight of catalysts or mineral fillers is typically equal to the weight of compounds actually used.

The upper and lower abrasion-resistant layer compositions of the invention may contain in some embodiments the same compound categories, but they are different as regards the contents of their components.

Thus, the Rs ratio is lower than or equal to 2.3, preferably lower than or equal to 2.0, more preferably lower than or equal to 1.5, even more preferably lower than or equal to 1.25, and most preferably is lower than or equal to 1.1, Rs being defined as follows:

$$Rs = \frac{\text{theoretical dry matter weight of compounds I in the upper layer composition}}{\text{theoretical dry matter weight of compounds II in the upper layer composition}}$$

This definition of The Rs ratio does imply that an upper layer composition free from any component II does not correspond to the definition of the invention. Rs is preferably higher than or equal to 0.85, more preferably higher than or equal to 0.9, even more preferably higher than or equal to 0.95.

The theoretical dry matter weight of compounds I represents preferably from 30 to 60% of the upper layer composition dry matter weight, more preferably from 40 to 55%. The theoretical dry matter weight of compounds II represents preferably from 30 to 60% of the upper layer composition dry matter weight, more preferably from 40 to 55%. The sum of the theoretical dry matter weights of compounds I and II represents preferably at least 75% of the lower layer composition dry matter weight, more preferably at least 80%, even more preferably at least 85%.

The upper layer composition dry matter weight represents preferably from 5 to 40%, more preferably from 15 to 25% by weight, as related to the total weight of the composition.

The upper layer composition does preferably comprise from 5 to 30% by weight of compounds I as related to the composition weight, preferably from 10 to 25%, more preferably from 10 to 20%. The upper layer composition does preferably comprise from 15 to 50% by weight of compounds II as related to the composition weight, preferably from 20 to 40%, more preferably from 25 to 40%.

The sum of the weights of compounds I and II represents preferably from 25 to 65% of the upper layer composition weight, preferably from 30 to 60%, more preferably from 35 to 55%. The weight ratio of compounds I to compounds II in this composition does preferably range from 0.25 to 0.60, more preferably from 0.30 to 0.60, and even more preferably from 0.35 to 0.45.

Ratio Ri is higher than 2.3, preferably higher than or equal to 3.0, more preferably higher than or equal to 3.5, even more preferably higher than or equal to 4.5, and most preferably is higher than or equal to 10, Ri being defined as follows:

$$Ri = \frac{\text{theoretical dry matter weight of compounds III in the lower layer composition}}{\text{theoretical dry matter weight of compounds IV in the lower layer composition}}$$

This definition of ratio Ri does imply that a lower layer composition free from any component IV corresponds to the definition of the invention, where Ri does indeed tend to infinity.

The theoretical dry matter weight of compounds III represents preferably more than 40% of the lower layer composition dry matter weight, more preferably more than 50%, even more preferably more than 60% and most preferably more than 65%. The theoretical dry matter weight of compounds IV represents preferably less than 30% of the lower layer composition dry matter weight, more preferably less than 25%, even more preferably less than 20% and most preferably less than 10%. The sum of the theoretical dry matter weights of compounds III and IV represents preferably at least 70% of the lower layer composition dry matter weight, more preferably at least 75%, even more preferably at least 80%.

The theoretical dry matter weight of the lower layer composition represents preferably from 10 to 50%, more preferably from 25 to 40% by weight, as related to the total weight of the composition.

The lower layer composition does preferably comprise from 15 to 70% by weight of compounds III as related to the composition weight, preferably from 20 to 60%, more preferably from 25 to 55%. The lower layer composition does preferably comprise from 0 to 35% by weight of compounds IV as related to the composition weight, preferably from 0 to 25%, more preferably from 0 to 15% and even more preferably from 0 to 10%. According to a particular embodiment, the lower layer composition does not comprise any compound of formula IV or any hydrolyzate of compounds of formula IV.

The sum of the weights of compounds III and IV represents preferably from 25 to 75% of the lower layer composition weight, preferably from 30 to 70%, more preferably from 35 to 65%. The weight ratio of compounds III to compounds IV in this composition is preferably higher than or equal to 1.25, more preferably higher than or equal to 1.50, even more preferably higher than or equal to 1.75. According to a particular embodiment, this ratio is higher than or equal to 4.

In the final optical article, the thickness of the abrasion- and scratch-resistant coating of the invention does typically vary from 1 to 15 µm, preferably from 1 to 10 µm, more preferably from 2 to 8 µm, and even more preferably from 3 to 6 µm. The thickness of the abrasion-resistant coating lower layer does preferably vary from 1 to 6 µm, more preferably from 2 to 5 µm, and even more preferably from 3 to 5 µm and the thickness of the abrasion-resistant coating upper layer does independently vary preferably from 0.5 to 4 µm, more preferably from 0.7 to 2 µm and even more preferably from 0.7 to 1.5 µm. The thickness ratio of the lower layer to the upper layer is preferably higher than or equal to 1.5, more preferably higher than or equal to 2.0, and even more preferably higher than or equal to 3.0.

A supplementary abrasion-resistant and/or scratch-resistant coating layer may optionally be deposited onto the upper layer of the bilayered coating of the invention. It will be typically called "supplementary abrasion-resistant and/or scratch-resistant layer". This supplementary layer and said upper layer are preferably adjacent to each other, that is to say directly contacting with and adhering to each other.

The supplementary abrasion-resistant and/or scratch-resistant layer is a cured layer of a supplementary abrasion-resistant and/or scratch-resistant composition, which comprises:
at least one organosilane compound, or a hydrolyzate thereof, of formula:

wherein the R" groups, being the same or different, are monovalent organic groups that are bound to silicon through a carbon atom and that contain at least one epoxy function, wherein the X" groups, being the same or different, are hydrolyzable groups, Y" is a monovalent organic group bound to silicon through a carbon atom, n" and m" being integers such that n"=1 or 2 with n"+m"=1 or 2, and
at least one compound, or a hydrolyzate thereof, of formula:

wherein M" represents a metal or a metalloid, Z" groups, being the same or different, are hydrolyzable groups and z, equal to or higher than 4, preferably from 4 to 6, is the metal or metalloid M" valence, the ratio:

$$Rss = \frac{\text{theoretical dry matter weight of compounds IX in the supplementary layer composition}}{\text{theoretical dry matter weight of compounds X in the supplementary layer composition}}$$

being lower than or equal to 2.3 and strictly lower than ratio Rs as previously defined, the theoretical dry matter weight of compounds X representing at least 45% of the dry matter weight of the supplementary abrasion-resistant and/or scratch-resistant layer composition and the thickness of the supplementary abrasion-resistant and/or scratch-resistant layer being lower than that of the upper layer of the bilayered coating of the invention.

The structural characteristics of the supplementary abrasion-resistant and/or scratch-resistant layer, and those concerning its preparation, may be selected from the ones which have been previously described for the upper layer of the bilayered coating of the invention, and for this reason they will not be repeated, except however the characteristics concerning ratio Rss, the thickness of this layer and the theoretical dry matter weight content for epoxysilanes of formula X as related to the dry matter weight of the composition, which are different.

Thus, for example, epoxysilanes of formula IX may be selected from the previously mentioned compounds as related to the description of compounds of formula I, and compounds of formula X may be selected from the previously mentioned compounds as related to the description of compounds of formula II.

Preferably, the theoretical dry matter weight of compounds X represents at least 50% of the dry matter weight of the supplementary abrasion-resistant and/or scratch-resistant layer composition, and preferably 65% or less, more preferably 60% or less, the most preferred range varying from 55 to 60%.

In the final optical article, the thickness of the abrasion-resistant and/or scratch-resistant additional layer, while being lower than that of the upper layer of the bilayered coating of the invention, does preferably vary from 0.5 to 2 µm, more preferably from 0.5 to 1.5 µm.

Ratio Rss is strictly lower than ratio Rs, which makes it possible to obtain a hardness gradient by increasing the ratio of II/IV/X type compounds from the abrasion-resistant lower layer to the supplementary abrasion-resistant and/or scratch-resistant layer. Rss is preferably lower than or equal to 2.0, more preferably lower than or equal to 1.5, even more preferably lower than or equal to 1.25, and most preferably is lower than or equal to 1.1. Rss is preferably higher than or equal to 0.85, more preferably higher than or equal to 0.9, even more preferably higher than or equal to 0.95.

Preferably, the optical article of the invention comprises 4 or less abrasion-resistant and/or scratch-resistant coating layers, more preferably 3 or less abrasion-resistant and/or scratch-resistant coating layers, and even more preferably 2 abrasion- and scratch-resistant coating layers, that is to say it does not comprise any further abrasion-resistant and/or scratch-resistant layers than those of the bilayered coating of the invention.

An antireflective coating may optionally be deposited onto the abrasion- and scratch-resistant coating, that is to say on its upper layer, or onto the supplementary abrasion-resistant and/or scratch-resistant layer. An antireflective coating is defined as a coating, deposited on the surface of an optical article, which improves the antireflective properties of the final optical article. It makes it possible to reduce the light reflection at the article-air interface over a relatively broad portion of the visible spectrum.

Antireflective coatings are well known and traditionally comprise a monolayered or a multilayered stack of dielectric materials such as SiO, $SiO_2$, $Al_2O_3$, $MgF_2$, LiF, $Si_3N_4$, $TiO_2$, $ZrO_2$, $Nb_2O_5$, $Y_2O_3$, $HfO_2$, $Sc_2O_3$, $Ta_2O_5$, $Pr_2O_3$, or mixtures thereof.

As is also well known, antireflective coatings are preferably, multilayered coatings comprising high refractive index (HI) layers and low refractive index (LI) layers, alternately. Advantageously, the LI layers of the antireflective coating comprise a mixture of $SiO_2$ and $Al_2O_3$.

In the present application, a layer of an antireflective stack is said to be a high refractive index layer when its refractive index is higher than 1.55, preferably higher than or equal to 1.6, more preferably higher than or equal to 1.8 and even more preferably higher than or equal to 2.0. A layer of an antireflective stack is said to be a low refractive index layer when its refractive index is lower than or equal to 1.55, preferably lower than or equal to 1.50, more preferably lower than or equal to 1.45.

Unless otherwise specified, the refractive indices which it is referred to in the present invention are expressed at 25° C. for a wavelength of 550 nm.

Preferably, total physical thickness of the antireflective coating is lower than 1 micrometer, more preferably lower than or equal to 500 nm and even more preferably lower than or equal to 250 nm. The total physical thickness of the antireflective coating is typically higher than 100 nm, preferably higher than 150 nm.

It is possible to interleave a sub-layer, typically a $SiO_2$ sublayer, between the antireflective coating and the underlying coating, which is typically the abrasion- and scratch-resistant coating, so as to improve the abrasion and/or scratch resistance of the antireflective coating and to increase its adhesion to the underlying coating.

The antireflective coating is typically applied by vacuum deposition according to any of following procedures: i) by evaporation, optionally ion beam assisted; ii) by ion beam sputtering; iii) by cathode sputtering; iv) by plasma-assisted chemical vapour deposition.

In addition to the vacuum deposition methods, it is possible to apply a multilayered antireflective coating using a wet process, particularly by spin-coating liquid compositions containing a silane hydrolyzate and colloidal materials having a high or low refractive index. Such coatings which layers comprise an organic/inorganic hybrid matrix based on silanes wherein colloidal materials are dispersed to adjust the refractive index of each layer are described for example in the French patent FR 2858420.

However, an antireflective coating comprising a stack exclusively comprising mineral dielectric layers is preferred. It does preferably comprise a stack of at least three dielectric layers with high refractive index and low refractive index layers, alternately.

The optical article of the invention may also comprise coatings formed on the antireflective coating that are able to modify its surface properties, such as hydrophobic coatings and/or oleophobic coatings (anti-fouling top coat). These coatings are preferably applied onto the outer layer of the antireflective coating. Their thickness is generally lower than or equal to 10 nm, and preferably ranges from 1 to 10 nm, more preferably from 1 to 5 nm.

They are typically fluorosilane or fluorosilazane type coatings. They may be obtained by depositing a fluorosilane or fluorosilazane precursor, comprising preferably at least two hydrolyzable groups per molecule. Fluorosilane precursors preferably comprise fluoropolyether moieties and more preferably perfluoropolyether moieties. These fluorosilanes are well known and are described, amongst others, in the U.S. Pat. No. 5,081,192, U.S. Pat. No. 5,763,061, U.S. Pat. No. 6,183,872, U.S. Pat. No. 5,739,639, U.S. Pat. No. 5,922,787, U.S. Pat. No. 6,337,235, U.S. Pat. No. 6,277,485 and in the European patent application EP 0933377.

A preferred hydrophobic and/or oleophobic coating composition is marketed by Shin-Etsu Chemical under the trade name KP 801M®. Another preferred hydrophobic and/or oleophobic coating composition is marketed by Daikin Industries under the trade name OPTOOL DSX®. It is a fluorinated resin comprising perfluoropropylene groups.

Typically, an optical article of the invention comprises a substrate successively coated with an impact-resistant primer layer, the bilayered scratch-resistant and abrasion-resistant coating of the invention, an antireflective stack and a hydrophobic and/or oleophobic coating. The article of the invention is preferably an optical lens, more preferably an ophthalmic lens for spectacles, or an optical or ophthalmic lens blank. The lens may be a polarized lens or a photochromic lens.

The present invention further relates to a method for making an abrasion- and scratch-resistant optical article such as defined hereabove, comprising at least the steps of:

a) providing an optical article comprising a substrate having at least one main surface;

b) depositing onto a substrate main surface a layer of a lower layer composition such as previously defined;

c) at least partially curing said lower layer composition using a thermal process;

d) depositing onto the layer resulting from the previous step a layer of an upper layer composition such as previously defined;

e) curing said upper layer composition using a thermal process;

f) recovering an optical article comprising a substrate having a main surface coated with an abrasion- and scratch-resistant coating composed of a lower layer adhering to an upper layer.

The lower layer composition may be deposited onto the substrate of the optical article according to any known suitable method, for example by dip coating, by spin coating, spraying, wetting or roll or brush coating, preferably by dip coating or by spin coating.

In a first alternative of the method, the lower layer composition is totally cured using a thermal process prior to depositing the upper layer composition, during step c). The curing is carried out preferably at a temperature ranging from 80 to 150° C., more preferably from 90 to 120° C., typically for 30 minutes to 4 hours.

Preferably, the optical article surface resulting from step c), that is to say the lower layer, does undergo a surface preparative treatment before the step of depositing the upper layer composition onto its surface (step d)).

This physical or chemical activating treatment, which is intended to increase the upper layer adhesion, is typically conducted under vacuum. It may comprise bombarding with the energetic species as previously defined, for example using an ion beam ("Ion Pre-Cleaning" or "IPC") or an electron beam, by a corona discharge treatment, by ion spallation, an ultraviolet treatment, a plasma treatment under vacuum, typically an oxygen or an argon plasma, an acidic or a basic treatment and/or using solvents (water or an organic solvent). Several of these treatments may be associated.

The surface preparation intermediate step is preferably a treatment using a basic solution, which comprises typically a few minute-long etching step (for 1 to 3 minutes) at temperatures approaching 40-50° C. in a 5% weight soda bath optionally containing surfactants.

The upper layer composition may be deposited onto the abrasion-resistant coating lower layer according to the same method than for the lower layer composition and may be cured using a thermal process in similar conditions as for it.

In a second alternative of the method, the lower layer composition is only partially cured using a thermal process prior to depositing the upper layer composition, during step c). This step, which may be defined as a prepolymerization or precuring step, is typically carried out at a temperature ranging from 70 to 120° C., preferably from 80 to 120° C., more preferably from 85 to 110° C., even more preferably from 90 to 100° C., for a relatively short time, typically for 1 to 30 minutes, more preferably for 3 to 20 minutes and even more preferably for 5 to 10 minutes.

Surprisingly, the present inventors did observe that a too long curing time could lead to a deterioration of the abrasion resistance properties of the final coating.

The second alternative of the method of the invention surprisingly enables omitting the previously described intermediate surface preparation between depositing the lower layer and the upper layer, which is particularly advantageous as regards the implementation on an industrial scale. Despite the omission of the intermediate step for preparing the lower layer surface, a very good adhesion is obtained in the final product between the two layers of the abrasion-resistant coating.

Thus, according to the second alternative of the method, the surface of the article resulting from step c) does not undergo before step d) a surface preparation treatment and the upper layer composition may be deposited directly onto the abrasion-resistant coating lower layer resulting from step c), according to the same methods as mentioned hereabove.

The upper layer composition may then be cured using a thermal process preferably at a temperature ranging from 80 to 150° C., preferably from 90 to 120° C., typically for 30 minutes to 4 hours, which does also complete the curing of the lower layer composition.

When a supplementary abrasion-resistant and/or scratch-resistant coating layer is required to be deposited onto the upper layer of the bilayered coating of the invention, steps e) and f) of the method of the invention then become:

e) at least partially curing said upper layer composition using a thermal process;

e1) depositing onto the layer resulting from the previous step a layer of a supplementary abrasion-resistant and/or scratch-resistant layer composition such as previously defined;

e2) curing said supplementary layer composition using a thermal process;

f) recovering an optical article composed of a substrate having a main surface coated with an abrasion- and scratch-resistant coating composed of a lower layer adhering to an upper layer, and coated with a supplementary layer of abrasion-resistant and/or scratch-resistant coating adhering to said upper layer.

Said upper layer may undergo a surface preparation treatment prior to depositing the supplementary layer composition onto its surface. Such physical or chemical activating treatment, intended to increase the adhesion of the supplementary layer, may be selected, without limitation, from the lower layer activating treatments as described hereabove.

In a first alternative, the upper layer composition is totally cured using a thermal process prior to depositing the supplementary abrasion-resistant and/or scratch-resistant layer composition. Its curing is carried out preferably at a temperature ranging from 80 to 150° C., preferably from 90 to 120° C., typically for 30 minutes to 4 hours.

In a second alternative, said upper layer composition may be only partially cured using a thermal process prior to depositing the composition of the supplementary layer. This step, which may be defined as being a prepolymerization or precuring step, is typically carried out at a temperature ranging from 80 to 120° C., preferably from 85 to 110° C., more preferably from 90 to 100° C., for a relatively short time, typically for 1 to 30 minutes, more preferably for 3 to 20 minutes and even more preferably for 5 to 10 minutes. In this second alternative, the upper layer surface of the bilayered coating of the invention does preferably not undergo, before the step of depositing the supplementary abrasion-resistant and/or scratch-resistant layer, any surface preparation treatment and the supplementary layer composition may be deposited directly onto the upper layer of the bilayered coating.

Despite the omission of the intermediate step of preparation of the lower layer surface, an excellent adhesion is obtained in the final product between the abrasion-resistant coating upper layer and said supplementary layer.

The supplementary layer composition may then be cured using a thermal process preferably at a temperature ranging from 80 to 150° C., preferably from 90 to 120° C., typically for 30 minutes to 4 hours, thus also completing the curing of the upper layer composition, and optionally lower layer composition.

The abrasion-resistant and/or scratch-resistant supplementary layer composition may be deposited according to any known suitable method, for example by dip coating, by spin coating, spraying, wetting or roll or brush coating, preferably by dip coating or by spin coating.

The optical article comprising a substrate onto which the abrasion- and scratch-resistant coating of the invention has been formed may also be a temporary support, onto which said coating is stored, waiting for being transferred to another substrate, which is typically the final substrate, such as a substrate for an ophthalmic lens. In this case, the lower layer and the upper layer of the bilayered coating should be deposited onto the temporary support in reverse order as compared to the expected stacking order on the final support.

The present invention thus further relates to a method for making an abrasion- and scratch-resistant optical article such as defined hereabove, comprising at least the steps of:

a) providing a temporary support having at least one main surface;

b) depositing onto a support main surface a layer of an upper layer composition such as previously defined;

c) at least partially curing said upper layer composition using a thermal process;

d) depositing onto the layer resulting from the previous step a layer of a lower layer composition such as previously defined;

e) curing said lower layer composition using a thermal process;

f) transferring the layers present on the temporary support main surface onto an optical article substrate main surface;

g) recovering an optical article comprising a substrate having a main surface coated with an abrasion- and scratch-resistant coating composed of a lower layer adhering to an upper layer.

Said temporary support may be rigid or flexible, preferably flexible. It is a removable support, that is to say it is intended to be removed once the transfer of the abrasion- and scratch-resistant coating of the invention has been effected to the support which is typically the final support.

The temporary support may be used, having previously been coated with a release agent layer so as to facilitate the transfer. Such layer may optionally be removed at the end of the transfer step.

Flexible temporary supports are typically a few millimeter-thick fine elements, that are preferably from 0.2 to 5 mm thick, more preferably from 0.5 to 2 mm thick, in a plastic material, preferably a thermoplastic material.

Thinner films may also be used as temporary supports.

Examples of thermoplastic (co)polymers that can be suitably used for making the temporary support encompass polysulfones, aliphatic poly(meth)acrylates, such as methyl poly(meth)acrylate, polyethylene, polypropylene, polystyrene, SBM bloc copolymers (styrene, butadiene and methyl methacrylate), polyphenylene sulfide (PPS), arylene polyoxides, polyimides, polyesters, polycarbonates such as bisphenol A polycarbonate, polyvinyl chloride, polyamides such as nylons, their copolymers and mixtures thereof. Polycarbonate is the preferred thermoplastic material.

The temporary support main surface may comprise a stack of one or more functional coating(s) (already described) which will be transferred on the final support at the same time as the abrasion- and scratch-resistant coating of the invention, in particular a supplementary abrasion-resistant and/or scratch-resistant layer such as previously defined. Of course, the coatings to be transferred have been deposited onto the temporary support in reverse order as compared to the expected stacking order on the final support.

Moreover, further functional coatings may be formed on the lower layer of the bilayered coating prior to conducting the transfer.

The present invention further relates to a method for transferring the abrasion- and scratch-resistant coating of the invention (or a coating stack comprising said abrasion- and scratch-resistant coating) from the temporary support to a final substrate.

The transfer of the coating(s) applied on the temporary support may be conducted according to any suitable method known by the man skilled in the art.

II is also possible to bound the abrasion- and scratch-resistant coating having been formed on a temporary support, to the final substrate, rather than to transfer it, the support being thus integrated to the final substrate.

The alternatives of the traditional deposition method may be adapted to the process including a transfer step. Thus, for example, the upper layer composition may be totally cured using a thermal process prior to depositing the lower layer composition, the upper layer may undergo a surface preparation treatment before the deposition step on its surface of the lower layer composition, and the upper layer composition may be only partially cured using a thermal process prior to depositing the lower layer composition.

Moreover, both layers of the bilayered scratch-resistant and abrasion-resistant coating of the invention may be separately transferred to a substrate, as well as any other coating such as a supplementary abrasion-resistant and/or scratch-resistant layer.

The following examples illustrate the invention in more detail without being limitative in any way. Unless otherwise specified, all percentages expressed are weight percentages.

EXAMPLES

1. General Procedures

The optical articles used in examples 1-8 and 11-15 comprise an ORMA® lens substrate from ESSILOR having a 65 mm diameter, a −2.00 dioptre power and being 1.2 mm thick, which convex face is successively coated with:
  optionally a 1 μm-thick layer of a polyurethane type impact-resistant primer based on Witcobond® 234 optionally filled (examples 15, 19, 21, 22);
  optionally a 2.5 μm-thick layer of an additional abrasion-resistant and/or scratch-resistant monolayered coating based on an epoxysilane hydrolyzate (example 18 only). The formulation and the preparation method of such coating are described in more detail hereunder;
  a bilayered scratch-resistant and abrasion-resistant coating in accordance with the invention, wherein the hardness gradient is obtained by increasing the tetrathoxysilane rate from the abrasion-resistant lower layer to the abrasion-resistant upper layer;
  optionally a supplementary abrasion-resistant and/or scratch-resistant coating layer (example 20); and
  optionally an antireflective coating composed of a stack of four $ZrO_2/SiO_2/ZrO_2/SiO_2$ layers formed by evaporation under vacuum, that were respectively 27, 21, 80 and 81 nm thick (examples 1, 2, 4 and 5 only).

Examples 9, 10, 16 and 17 are comparative examples using lower and/or upper layer compositions that are not in accordance with the present invention.

a) Preparation of the Abrasion-Resistant Lower Layer Compositions

Lower Layer Composition A:

180 g of hydrochloric acid 0.1N were dropped into a solution containing 280 g of Glymo and 150 g of tetrathoxysilane (TEOS). During hydrolysis, the temperature raised up to 45° C. The hydrolyzed solution was stirred for 24 hours at room temperature, then 45 g of itaconic acid, 14 g of N-cyanoguanidine, 330 g of methanol and 1.5 g of surfactant FC 430 were added thereto, so as to improve the spreading capacity of such formulation. The theoretical dry matter (TDM) of this composition was of about 30% by weight.

Lower Layer Composition A1:

102.8 g of hydrochloric acid 0.1N were dropped into a beaker containing 385.8 g of Glymo. During hydrolysis, the temperature raised up to 40-42° C. The hydrolyzed solution was stirred for 24 hours at room temperature, then 61.6 g of itaconic acid, 15.4 g of N-cyanoguanidine, 432.9 g of methanol and 1.5 g of surfactant FC 430 were added thereto. The theoretical dry matter (TDM) of this composition was of about 35% by weight.

Lower Layer Composition A2:

101.8 g of hydrochloric acid 0.1N were dropped into a beaker containing 445.2 g of Glymo. During hydrolysis, the temperature raised up to 43° C. The hydrolyzed solution was stirred for 24 hours at room temperature, then 18.9 g of aluminium acetylacetonate, 333 g of methanol and 1.5 g of surfactant FC 430 were added thereto. The theoretical dry matter (TDM) of this composition was of about 35% by weight.

Lower Layer Composition A3:

151.5 g of hydrochloric acid 0.1N were dropped into a solution containing 365 g of Glymo and 196.6 g of tetrathoxysilane (TEOS). During hydrolysis, the temperature raised up to 42° C. The hydrolyzed solution was stirred for 24 hours at room temperature, then 18.9 g of aluminium acetylacetonate, 166.6 g of methanol and 1.35 g of surfactant FC 430 were added thereto. The theoretical dry matter (TDM) of this composition was of about 35% by weight.

Lower Layer Composition A4 (Comparative Composition):

64 g of hydrochloric acid 0.1N were dropped into 183 g of Glymo under stirring. During hydrolysis, the temperature raised up to 46° C. After 30 minutes, the hydrolyzate temperature had decreased to 28° C., and 91 g of DMDES (dimethyl diethoxysilane) were then dropped. This addition is slightly exothermic (29° C.).

The hydrolyzed solution was stirred for 24 hours at room temperature, then 583.3 g of a colloidal silica dispersion Suncolloid MAST from NISSAN, 30% dry matter in methanol, 10.5 g of aluminium acetylacetonate, 31.5 g of methyl ethyl ketone, 35.2 g of methanol and 1.5 g of surfactant FC 430 were added thereto. The theoretical dry matter (TDM) of this composition was of about 35% by weight.

Lower Layer Composition A5:

2.15 g of phosphoric acid (purity: 99%) were dropped into a solution containing 271.3 g of Glymo and 166.4 g of TEOS. During hydrolysis, the temperature raised up to 45° C. The hydrolyzed solution was stirred for 24 hours at room temperature, then 9.6 g of N-cyanoguanidine, 239.3 g of deionized water, 110.4 g of 1-methoxypropan-2-ol marketed under the trade name DOWANOL PM® by Dow Chemical and 0.8 g of surfactant EFKA® 3034 (Ciba Specialty Chemicals) were added thereto, so as to improve the spreading capacity of such formulation. The theoretical dry matter (TDM) of this composition was of about 31.2% by weight. Remark: in comparative example 16, composition A5 was used as an upper layer composition.

Lower Layer Composition A6:

77.6 g of hydrochloric acid 0.1N were dropped into a beaker containing 339.2 g of Glymo. During hydrolysis, the temperature raised up to 40-42° C. The hydrolyzed solution was stirred for 24 hours at room temperature, then 10.8 g of itaconic acid, 3.4 g of N-cyanoguanidine, 367.9 g of methanol and 1.2 g of surfactant EFKA® 3034 (Ciba Specialty Chemicals) were added thereto. The theoretical dry matter (TDM) of this composition was of about 31.35% by weight.

Lower Layer Composition A7:

102.4 g of hydrochloric acid 0.1N were dropped into a beaker containing 224 g of Glymo and 120 g of TEOS. During hydrolysis, the temperature raised up to 45° C. The hydrolyzed solution was stirred for 24 hours at room temperature, then 36 g of itaconic acid, 11.2 g of N-cyanoguanidine, 264 g of methanol and 0.8 g of surfactant EFKA® 3034 (Ciba Specialty Chemicals) were added thereto. The theoretical dry matter (TDM) of this composition was of about 30% by weight.

Lower Layer Composition A8:

This composition is obtained by mixing the components mentioned in the table hereunder. The resulting layer has a high refractive index because of the titanium-based colloid.

| Components | gram |
| --- | --- |
| Glymo | 174.88 |
| HCl 0.1N | 71.99 |

-continued

| Components | gram |
| --- | --- |
| $TiO_2/SiO_2/ZrO_2$ composite particle colloid (firm CCIC) | 609.61 |
| Al(Acac)$_3$ | 9.08 |
| Methyl ethyl ketone | 27.23 |
| Methanol | 9.36 |
| EFKA ® 3034 | 1.50 | b) Preparation of the Abrasion-Resistant Upper Layer Compositions

Upper Layer Composition B:

130.5 g of hydrochloric acid 0.1N were dropped into a solution containing 126.1 g of Glymo and 294.4 g of TEOS. During hydrolysis, the temperature raised up to 49° C. The hydrolyzed solution was stirred for 24 hours at room temperature, then 20.8 g of itaconic acid, 5 g of N-cyanoguanidine, 423.1 g of methanol and 1.5 g of surfactant FC 430 were added thereto, so as to improve the spreading capacity of such formulation. The theoretical dry matter (TDM) of this composition was of about 20% by weight.

Upper Layer Composition B1:

152.3 g of hydrochloric acid 0.1N were dropped into a solution containing 141.3 g of Glymo and 346.7 g of TEOS. During hydrolysis, the temperature raised up to 47° C. The hydrolyzed solution was stirred for 24 hours at room temperature, then 12 g of aluminium acetylacetonate, 346 g of methanol and 1.5 g of surfactant FC 430 were added thereto, so as to improve the spreading capacity of such formulation. The theoretical dry matter (TDM) of this composition was of about 20% by weight.

Upper Layer Composition B2 (Comparative Composition):

29.1 g of hydrochloric acid 0.1N were dropped into a solution containing 127.2 g of Glymo. During hydrolysis, the temperature raised up to 45° C. The hydrolyzed solution was stirred for 24 hours at room temperature, then 366.7 g of a colloidal silica dispersion Suncolloid MAST from NISSAN, 30% dry matter in methanol, 6.3 g of aluminium acetylacetonate, 18.9 g of methyl ethyl ketone, 450.4 g of methanol and 1.5 g of surfactant FC 430 were added thereto. The theoretical dry matter (TDM) of this composition was of about 20% by weight.

Upper Layer Composition B3:

2.43 g of phosphoric acid (purity: 99%) were dropped into a solution containing 169.6 g of Glymo and 277.4 g of TEOS. During hydrolysis, the temperature raised up to 45° C. The hydrolyzed solution was stirred for 24 hours at room temperature, then 9.6 g of N-cyanoguanidine, 269.5 g of deionized water, 72.3 g of 1-methoxypropan-2-ol marketed under the trade name DOWANOL PM® by Dow Chemical and 0.8 g of surfactant EFKA® 3034 (Ciba Specialty Chemicals) were added thereto, so as to improve the spreading capacity of such formulation. The theoretical dry matter (TDM) of this composition was of about 26% by weight. Remark: in comparative example 17, composition B3 was used as a lower layer composition.

Upper Layer Composition B4 (Comparative Composition):

2.45 g of phosphoric acid (purity: 99%) were dropped into a solution containing 90.4 g of Glymo and 332.9 g of TEOS. During hydrolysis, the temperature raised up to 45° C. The hydrolyzed solution was stirred for 24 hours at room temperature, then 9.6 g of N-cyanoguanidine, 271.7 g of deionized water, 95.3 g of 1-methoxypropan-2-ol marketed under the trade name DOWANOL PM® by Dow Chemical and 0.8 g of surfactant EFKA® 3034 (Ciba Specialty Chemicals) were added thereto, so as to improve the spreading capacity of such formulation. The theoretical dry matter (TDM) of this composition was of about 20.8% by weight.

Upper Layer Composition B5:

1.92 g of phosphoric acid (purity: 99%) were dropped into a solution containing 102.4 g of Glymo and 249.6 g of TEOS. During hydrolysis, the temperature raised up to 45° C. The hydrolyzed solution was stirred for 24 hours at room temperature, then 5.6 g of N-cyanoguanidine, 219.2 g of deionized water, 220.5 g of 1-methoxypropan-2-ol marketed under the trade name DOWANOL PM® by Dow Chemical and 0.8 g of surfactant EFKA® 3034 (Ciba Specialty Chemicals) were added thereto, so as to improve the spreading capacity of such formulation. The theoretical dry matter (TDM) of this composition was of about 18% by weight.

c) Deposition Procedures for the Abrasion-Resistant Bilayered Coating

Procedure 1

A substrate for an ophthalmic lens ORMA® (optionally coated with a primer layer, example 15) was coated by being dip-coated with a lower layer composition. The dewetting rate of these lenses was adjusted in such a way that the deposited thickness was of 3.5 μm. The lower layer composition was then polymerized in an oven for 3 h at 100° C.

After such polymerization, the lens coated with the abrasion-resistant lower layer did undergo a surface preparation intermediate treatment aiming at activating the surface of the abrasion-resistant lower layer so as to facilitate the anchoring of the abrasion-resistant upper layer.

The lens was then coated by being dip-coated with an upper layer composition, by adjusting the dewetting rate so as to obtain a deposition of 1 μm thick. Such upper layer composition was then polymerized in an oven for 3 h at 100° C.

Procedure 2

A substrate for an ophthalmic lens ORMA® was coated by being dip coated with a lower layer composition. The dewetting rate of these lenses was adjusted in such a way that the deposited thickness was of 3.5 μm. The lower layer composition was then prepolymerized in an oven for 10 min at 90° C.

The lens was then cooled for 15 minutes at room temperature and was then directly coated by being dip-coated with an upper layer composition by adjusting the dewetting rate so as to obtain a deposition of 1 μm thick.

This upper layer composition was then polymerized in an oven for 3 h at 100° C. thus also completing the polymerization of the lower layer composition.

Procedure 3

The same as Procedure 2, except for the prepolymerization step of the lower layer which was carried out for 15 min at 90° C.

Procedure 4

The same as Procedure 2, except for the prepolymerization step of the lower layer which was carried out for 5 min at 100° C.

Procedure 5

The same as Procedure 2, except for the prepolymerization step of the lower layer which was carried out for 10 min at 100° C.

Procedure 6

The same as Procedure 2, except for the prepolymerization step of the lower layer which was carried out at 100° C. for 30 min, and the step of polymerization which was conducted at 100° C. for 30 minutes.

Moreover, the lens dewetting rate was adjusted in such a way that the lower layer composition deposited be 3 μm thick and the upper layer composition deposited be 1.5 μm thick.

Procedure 7

The same as Procedure 6, except that prior to depositing the lower layer composition, the substrate for the ophthalmic lens ORMA® was coated by being dip coated with a monolayer of an additional abrasion-resistant and/or scratch-resistant coating (the dewetting rate of the lens being adjusted in such a way that the deposited thickness be of 2.5 μm), which was prepolymerized in an oven for 30 min at 100° C.

Moreover, the lens dewetting rate was adjusted in such a way that the lower layer composition deposited be 2 μm thick and the upper layer composition deposited be 1.5 μm thick.

Said additional monolayered abrasion-resistant and/or scratch-resistant coating was formed from a composition obtained as follows:

77.6 g of hydrochloric acid 0.1N were dropped into a beaker containing 339.2 g of Glymo. During hydrolysis, the temperature raised up to 40-42° C. The hydrolyzed solution was stirred for 24 hours at room temperature, then 10.8 g of itaconic acid, 3.4 g of N-cyanoguanidine, 367.9 g of methanol and 1.2 g of surfactant EFKA® 3034 (Ciba Specialty Chemicals) were added thereto. The theoretical dry matter (TDM) of this composition was of about 31.35% by weight.

Procedure 8

The same as Procedure 2, except that prior to depositing the lower layer composition, the substrate for the ophthalmic lens ORMA® was coated by being dip coated with a 8 μm-thick impact-resistant primer layer, prepolymerized for 30 minutes at 90° C.

The primer layer was formed from a composition prepared by successively mixing 225.7 g of the polyurethane latex Witcobond® 234, 774.4 g of demineralized water, 370.8 g of colloidal fillers HX305 W1 (colloid of $SnO_2$) marketed by CCIC, and 3 g of surfactant Silwet L-77®. The theoretical dry matter of this primer composition was of 20%.

Moreover, the lens dewetting rate was adjusted in such a way that the lower layer composition deposited be 3 μm thick and the prepolymerization step of the lower layer was conducted at 90° C. for 30 min.

Procedure 9

A substrate for an ophthalmic lens ORMA® was coated by being dip coated with a lower layer composition. The dewetting rate of these lenses was adjusted in such a way that the deposited thickness be of 2.5 μm. The lower layer composition was then prepolymerized in an oven for 30 min at 100° C.

The lens was then cooled for 15 minutes at room temperature and was then directly coated by being dip coated with an upper layer composition by adjusting the dewetting rate so as to obtain a deposit thickness of 1.5 μm. The upper layer composition was then prepolymerized in an oven for 30 min at 90° C.

The lens was cooled for 15 minutes at room temperature and was then directly coated by being dip coated with an abrasion-resistant and/or scratch-resistant coating additional layer (the dewetting rate of the lens being adjusted in such a way that the deposited thickness be of 1 μm), such a deposition being followed with a polymerisation final step of the whole, that was conducted at 90° C. for 30 minutes.

The additional layer of monolayered abrasion-resistant and/or scratch-resistant coating was formed from a composition obtained as follows:

2.45 g of phosphoric acid (purity: 99%) were dropped into a solution containing 90.4 g of Glymo and 332.9 g of TEOS. During hydrolysis, the temperature raised up to 45° C. The hydrolyzed solution was stirred for 24 hours at room temperature, then 9.6 g of N-cyanoguanidine, 271.7 g of deionized water, 95.3 g of 1-methoxypropan-2-ol marketed under the trade name DOWANOL PM® by Dow Chemical and 0.8 g of surfactant EFKA® 3034 (Ciba Specialty Chemicals) were added thereto, so as to improve the spreading capacity of such formulation. The theoretical dry matter (TDM) of this composition was of about 20.8% by weight.

Procedure 10:

The same as Procedure 8, except that the primer layer was formed from a composition prepared by successively mixing 171.81 g of the polyurethane latex Witcobond® 234, 201.8 g of demineralized water, 196.98 g of colloidal silica fillers LUDOX H540 (silica content of 40% by weight), 531.2 g of demineralized water and 1.844 g of surfactant Silwet L-77®. The theoretical dry matter of this primer composition was of 15%.

d) Surface Pre-Treatment Procedures of the Abrasion-Resistant Lower Layer

Surface Preparation Using Soda

The lenses coated with the abrasion-resistant lower layer were dipped into a 5% weight soda bath at a temperature of 50° C. (except for tests 1 and 15 where the temperature was of 40° C.), provided with ultrasounds, for 1 minute. They were then rinsed in demineralized water, and dried.

Surface Preparation Using Plasma

The lenses coated with the abrasion-resistant lower layer did undergo an oxygen plasma treatment (power 1200 W for 4.5 minutes, gas flow rate $O_2$: 200 mL/min, pressure 0.2 bar).

Surface Preparation Using Corona

The lenses coated with the abrasion-resistant lower layer did undergo a corona discharge treatment (distance between glass and electrode from 1 cm to 2 cm, treatment time 10 seconds, power of the emitter 100 V.

2. Characterizations

To appreciate the properties of the coated glasses obtained in the examples, the abrasion resistance was measured by means of the value obtained in the BAYER ISTM test, the scratch resistance using a steel wool test, and the abrasion-resistant coating adhesion using the "cross-hatch test".

Obtaining a high value in the BAYER ISTM test is an indication of a high level of abrasion resistance, whereas a low value in the steel wool test is an indication of a high level of scratch resistance.

The three tests employed are described hereunder.

a) Characterization of the Abrasion Resistance: BAYER ISTM Test (Bayer Alumina)

The abrasion resistance was evaluated by determining the BAYER ISTM values for substrates coated with the abrasion-resistant coating of the invention or with a comparative abrasion-resistant coating, for substrates coated with the abrasion-resistant coating of the invention and with an antireflective coating (examples 1, 2, 4, 5), for substrates coated with a primer coating and with the abrasion-resistant coating of the invention (examples 15, 19, 21, 22), for substrates coated with an additional abrasion-resistant and/or scratch-resistant coating and with the abrasion-resistant bilayered coating of the invention (example 18), or for substrates coated with the abrasion-resistant bilayered coating of the invention and with a supplementary abrasion-resistant and/or scratch-resistant coating layer (example 20).

This BAYER value was determined based on ASTM F735-81 standard, with following modifications: 300 cycles were effected rather than 200 and the abrasive powder was not sand but alumina ($Al_2O_3$) ZF 152412 provided by Ceramic Grains (formerly Norton Materials, New Bond Street, PO Box 15137 Worcester, Mass. 01615-00137).

This test consists in simultaneously stirring a sample glass and a standard glass with a determinated reciprocating motion in a vessel containing the abrasive powder (approximately 500 g) having a defined particle size at a frequency of 100 cycles/minute for 3 minutes. Diffusion measurement H "before/after" of the sample glass was compared with that of a standard glass, especially a CR-39®-based bare glass, for which the BAYER value ISTM was fixed to 1. The BAYER value ISTM was calculated as R=H standard/H sample glass.

Diffusion measurement was conducted by using a Hazeguard system model XL-211 made by Pacific Scientific.

The BAYER ISTM value was estimated to be good when R was higher than or equal to 3 and lower than 4.5, and excellent when R was equal to or higher than 4.5.

b) Hardness Characterization—Scratch Resistance (Manual Test)

The scratch resistance was measured by using the steel wool test which did consist in performing 5 forward and back motions by rubbing with the hand along 4-5 cm the face of a glass coated according to the invention with a steel wool, in the fiber direction, while applying a constant pressure on the steel wool during this operation (5 k g forward, 2.5 k g back). A piece of about 3 cm×3 cm of extra fine steel wool STARWAX (grade 000) folded upon itself was used.

The glass was then wiped with a dry cloth, rinsed with alcohol, then visually examined. A notation was given according to the following graduation (3 scores: 1, 3 or 5).

1: there is no visible scratch observed or barely visible scratch on the glass (from 1 to 10 scratches)

3: relatively scratched glass (from 11 to 50 scratches)

5: strongly scratched glass (more than 50 scratches)

c) Characterization of the Abrasion-Resistant Coating Adhesion ("Cross-Hatch Test")

The adhesion test was made based on the ASTM D3359-93 standard and resulted in a qualitative ordering ranging from 0 to 5, 0 being the best result.

It did consist in notching the abrasion-resistant bilayered coating of the invention deposited onto a substrate using a precision knife, according to a cross-hatched pattern of notching lines, in applying an adhesive tape onto the thus cross-hatched coating and in trying to tear it out with the same. The results were considered to be good at level zero if the edges where the notches were made remained perfectly smooth and if no square, amongst the ones they did delimit, came off.

This adhesion test may also be conducted after the lens substrate coated with the abrasion-resistant bilayered coating of the invention has been dipped into a bath of boiling hot water for 30 minutes.

3. Results

The performances of both abrasion and scratch resistance for the various optical articles prepared are given in Table 1. The results of the comparative tests are in bold.

TABLE 1

| Example | 1 | 2 | 3 | 4 | 5 | 6 | 7 | 8 | 9 | 10 | 11 | 12 |
|---|---|---|---|---|---|---|---|---|---|---|---|---|
| Lower layer composition | A | A | A | A1 | A2 | A3 | A | A1 | A | A4 | A | A |
| Intermediate surface preparation | S | P | C | S | S | S | S | S | S | S | — | — |
| Upper layer composition | B | B | B | B | B | B | B1 | B1 | B2 | B2 | B | B |
| AR coating | yes | yes | no | yes | yes | no | no | no | no | no | no | no |
| Ri | 4.7 | 4.7 | 4.7 | +∞ | +∞ | 4.6 | 4.7 | +∞ | 4.7 | +∞ | 4.7 | 4.7 |
| Rs | 1.05 | 1.05 | 1.05 | 1.05 | 1.05 | 1.05 | 1.05 | 1.05 | +∞ | +∞ | 1.05 | 1.05 |
| Deposition procedure of the abrasion-resistant coating | 1 | 1 | 1 | 1 | 1 | 1 | 1 | 1 | 1 | 1 | 2 | 3 |
| Bayer ISTM Test Without AR coating | 19.2 | 12.6 | 9.8 | 15.8 | 17.1 | 8.1 | 7.6 | 9.1 | 6.4 | 5.2 | 16.5 | 13.5 |
| Steel wool test Without AR coating | 1 | 1 | 1 | 1 | 1 | 1 | 1 | 3 | 1 | 3 | 1 | 1 |
| Bayer ISTM Test with AR coating | 11.2 | 4.8 | | 6.1 | 5.8 | | | | | | | |

| Example | 13 | 14 | 15* | 16 | 17 | 18 | 19* | 20 | 21* | 22* |
|---|---|---|---|---|---|---|---|---|---|---|
| Lower layer composition | A | A | A | A6 | B3 | A7 | A7 | A5 | A7 | A8 |
| Intermediate surface preparation | — | — | S | — | — | — | — | — | — | — |
| Upper layer composition | B | B | B | A5 | B4 | B5 | B5 | B3 | B5 | B5 |
| AR coating | no | no | no | no | no | no | no | no | no | no |
| Ri | 4.7 | 4.7 | 4.7 | +∞ | 1.5 | 4.6 | 4.6 | 4 | 4.6 | 4.5 |
| Rs | 1.05 | 1.05 | 1.05 | 4 | 0.67 | 1 | 1 | 1.5 | 1 | 1 |
| Deposition procedure of the abrasion-resistant coating | 4 | 5 | 1 | 6 | 6 | 7 | 8 | 9 | 10 | 8 |
| Bayer ISTM Test Without AR coating | 18.2 | 14.2 | 19.4 | 0.9 | 6.6 | 12.5 | 12.2 | 11.7 | 12.7 | 9.7 |
| Steel wool test Without AR coating | 1 | 1 | 1 | | | | 3 | | 3 | 3 |
| Bayer ISTM Test with AR coating | | | | | | | 10 | | | |

S = soda,
P = plasma,
C = corona.
AR = antireflective.
*Substrate pre-coated with an impact-resistant primer layer.

The abrasion-resistant coatings according to the invention offer much higher performances than those that would have been obtained if a monolayered coating had been used. After having deposited an antireflective coating onto the abrasion-resistant coating, the performances were also much higher than those that would have been obtained if a monolayered coating had been used.

Examples 1 to 3 show that an intermediate surface preparation using soda is preferred as compared to a plasma or corona discharge treatment.

Compositions A and B, which contained a GLYMO and TEOS mixture and which used the itaconic acid/N-cyanoguanidine catalyst system are more efficient than compositions A3 and B1 which used the Al(acac)$_3$ catalyst.

The results of comparative examples 9 and 10, which used colloidal silica rather than TEOS, are much poorer as regards the abrasion- and scratch resistance. In the same way, the articles of comparative examples 16 and 17, which did not present Rs and/or Ri ratios in accordance with those of the invention, have a poor abrasion resistance.

The conducted adhesion tests (cross-hatch test) did reveal a very strong intercoat adhesion (score: zero), even after the glasses remained dipped for 30 minutes in water at 100° C., and this result was obtained whether the first alternative of the method the invention was carried out (examples 1 to 8 and 15, with the intermediate surface preparation) or the second alternative of the method of the invention (examples 11 to 14, with no intermediate surface preparation). In the latter case, the adhesion between the two layers of the abrasion-resistant coating is obtained by prepolymerizing the lower layer.

Introducing a primer coating did not change the abrasion and scratch resistance properties of the optical articles (results from examples 1, 15, 19, 21 and 22).

Introducing an additional abrasion-resistant coating between the substrate and the bilayered coating of the invention also leads to articles having a very high abrasion resistance (example 18), as well as introducing a supplementary abrasion-resistant and/or scratch-resistant coating layer in contact with the upper layer of the bilayered coating of the invention (example 20).

Examples 19, 21 and 22 illustrate the invention for a stack comprising in a colloid filled primer ($SiO_2$ for example 21 and $SnO_2$ for examples 19 and 22) and a lower layer of the bilayered coating itself filled with colloid (example 22).

The invention claimed is:

1. An optical article comprising a substrate having at least one main surface coated with an abrasion- and scratch-resistant coating, the coating comprised of, starting from the substrate, a lower layer and an upper layer that adhere with each other, the upper layer being a layer of a cured upper layer composition and the lower layer being a layer of a cured lower layer composition wherein:

the upper layer composition comprises:
at least one organosilane compound, or a hydrolyzate thereof, of formula:

$$R_nY_mSi(X)_{4-n-m} \quad (I)$$

wherein the R groups are individually monovalent organic groups that are bound to silicon through a carbon atom and that contain at least one epoxy function, the X groups are individually hydrolyzable groups, Y is a monovalent organic group bound to silicon through a carbon atom, n and m being integers such that n=1 or 2 with n+m=1 or 2; and at least one compound, or a hydrolyzate thereof, of formula:

$$M(Z)_x \quad (II)$$

wherein M represents a metal or a metalloid, the Z groups are individually hydrolyzable groups and x, equal to or higher than 4, is a metal or metalloid M valence, the ratio:

$$Rs = \frac{\text{theoretical dry matter weight of compounds I in the upper layer composition}}{\text{theoretical dry matter weight of compounds II in the upper layer composition}}$$

being lower than or equal to 2.3; and
the lower layer composition comprises:
at least one organosilane compound, or a hydrolyzate thereof, of formula:

$$R'_{n'}Y'_{m'}Si(X)_{4-n'-m'} \quad (III)$$

wherein the R' groups are individually monovalent organic groups that are bound to silicon through a carbon atom and that contain at least one epoxy function, the X' groups are individually hydrolyzable groups, Y' is a monovalent organic group bound to silicon through a carbon atom, n' and m' being integers such that n'=1 or 2 with n'+m'=1 or 2, wherein the lower and/or upper layer compositions comprise a catalytic system composed of aluminum acetylacetonate or composed of a mixture of itaconic acid and N-cyanoguanidine.

2. The article of claim 1, wherein compound (II) is of formula $Si(Z)_4$, wherein the Z groups are individually hydrolyzable groups.

3. The article of claim 1, wherein the lower layer composition further comprises at least one compound, or a hydrolyzate thereof, of formula:

$$M'(Z')_y \quad (IV)$$

wherein M' represents a metal or a metalloid, the Z' groups are individually hydrolyzable groups and y is higher than or equal to 4 and the metal or metalloid M' valence, the ratio:

$$Ri = \frac{\text{theoretical dry matter weight of compounds III in the lower layer composition}}{\text{theoretical dry matter weight of compounds IV in the lower layer composition}}$$

being higher than 2.3.

4. The article of claim 3, wherein compound (IV) is of formula $Si(Z')_4$, wherein the Z' groups are individually hydrolyzable groups.

5. The article of claim 3, wherein Ri is higher than or equal to 3.5.

6. The article of claim 3, wherein compound III is γ-glycidoxypropyl trimethoxysilane, compound IV is tetraethoxysilane and Rs ranges from 1 to 1.5.

7. The article of claim 1, wherein Rs is lower than or equal to 2.0 and higher than or equal to 0.85.

8. The article of claim 1, wherein the theoretical dry matter weight of compound I represents from 30 to 60% of the upper layer composition dry matter weight.

9. The article of claim 1, wherein the theoretical dry matter weight of compound III represents more than 40% of the lower layer composition dry matter weight.

10. The article of claim 1, wherein the theoretical dry matter weight of compound IV represents less than 30% of the lower layer composition dry matter weight.

11. The article of claim 1, wherein the thickness of the abrasion- and scratch-resistant coating does vary from 1 to 15 μm.

12. The article of claim 1, wherein the thickness ratio of the lower layer to the upper layer is higher than or equal to 1.5.

13. The article of claim 1, wherein the Y or Y' groups are independently $C_1$-$C_4$ alkyl groups, alkenyl, $C_6$-$C_{10}$ aryl groups, methacryloxyalkyl, acryloxyalkyl, fluoroalkyl, perfluoroalkyl, (poly)fluoro alkoxy[(poly)alkylenoxy]alkyl and/or perfluoro alkoxy[(poly)alkylenoxy]alkyl groups.

14. The article of claim 1, wherein the R or R' groups are selected, independently from each other, from groups of formulas V and VI:

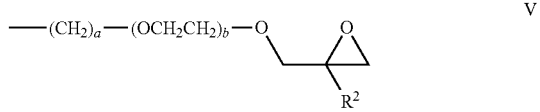

-continued

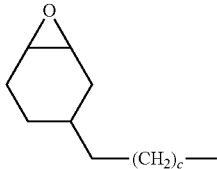
VI wherein R² is an alkyl group or a hydrogen atom, a and c are integers ranging from 1 to 6, and b is 0, 1 or 2.

15. The article of claim 14, wherein the R or R' groups are independently γ-glycidoxypropyl groups, β-(3,4-epoxycyclohexyl)ethyl and/or γ-glycidoxyethoxypropyl groups.

16. The article of claim 1, wherein compounds of formula I and/or III are, independently compounds of formulas VII and $(R^1O)_3Si(CH_2)_a$—$(OCH_2CH_2)_b$—O  VII

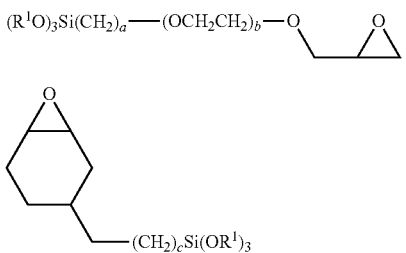
VIII wherein R¹ is an alkyl moiety having from 1 to 6 carbon atoms, a and c are integers ranging from 1 to 6, and b is 0, 1 or 2.

17. The article of claim 1, wherein compounds of formula II and/or IV are independently a tetraalkoxysilane.

18. The article of claim 1, wherein the lower and/or upper layer compositions comprise at least one condensation catalyst and/or at least one curing catalyst.

19. The article of claim 18, wherein the condensation catalyst comprises an acid or anhydride of polyfunctional saturated or unsaturated acids.

20. The article of claim 1, wherein the lower and/or upper layer compositions comprise less than 10% by weight of fillers as related to the total weight of the composition.

21. The article of claim 1, further defined as comprising, starting from the substrate, an impact-resistant primer layer coated with the abrasion- and scratch-resistant coating.

22. The article of claim 1, further comprising a supplementary layer of an abrasion-resistant and/or scratch-resistant coating contacting the upper layer, the abrasion-resistant and/or scratch-resistant supplementary layer being a layer of cured supplementary abrasion-resistant and/or scratch-resistant layer composition, the supplementary layer composition comprising:

at least one organosilane compound, or a hydrolyzate thereof, of formula:

$$R'''_{n''}Y''_{m''}Si(X'')_{4-n''-m''} \quad (IX)$$

wherein the R'' groups are individually monovalent organic groups that are bound to silicon through a carbon atom and that contain at least one epoxy function, the X'' groups are individually hydrolyzable groups, Y'' is a monovalent organic group bound to silicon through a carbon atom, n'' and m'' being integers such that n''=1 or 2 with n''+m''=1 or 2; and at least one compound, or a hydrolyzate thereof, of formula:

$$M''(Z'')_z \quad (X)$$

wherein M'' represents a metal or a metalloid, the Z'' groups are individually hydrolyzable groups and z, equal to or higher than 4, is a metal or metalloid M'' valence, the ratio:

$$Rss = \frac{\text{theoretical dry matter weight of compounds IX in the supplementary layer composition}}{\text{theoretical dry matter weight of compounds X in the supplementary layer composition}}$$

being lower than or equal to 2.3 and strictly lower than ratio Rs, the supplementary theoretical dry matter weight of compounds X comprising at least 45% of the dry matter weight of the supplementary abrasion-resistant and/or scratch-resistant layer composition and the thickness of the supplementary abrasion-resistant and/or scratch-resistant layer being lower than that of the upper layer.

23. The article of claim 22, wherein z is from 4 to 6.

24. The article of claim 22, wherein Rss is lower than or equal to 2.0.

25. The article of claim 24, wherein Rss is higher than or equal to 0.85.

26. The article of claim 1, further defined as an ophthalmic lens.

27. A method for making an abrasion- and scratch-resistant optical article comprising a substrate, comprising:
a) providing an optical article comprising a substrate having at least one main surface;
b) depositing onto a substrate main surface a layer of a lower layer composition such as defined in claim 1;
c) at least partially curing the lower layer composition using a thermal process;
d) depositing onto the layer resulting from the previous step a layer of an upper layer composition as defined in claim 1;
e) curing the upper layer composition using a thermal process; and
f) recovering an optical article comprising a substrate having a main surface coated with an abrasion- and scratch-resistant coating composed of a lower layer adhering to an upper layer.

28. The method of claim 27, wherein the lower layer composition is totally cured using a thermal process during step c) at a temperature ranging from 80 to 150° C., for 30 minutes to 4 hours.

29. The method of claim 27, wherein the surface of the article resulting from step c) does undergo before step d) a surface preparation treatment intended to increase the adhesion of the upper layer.

30. The method of claim 27, wherein the lower layer composition is partially cured using a thermal process during step c) at a temperature ranging from 70 to 120° C. for 1 to 30 minutes and wherein the surface of the article resulting from step c) does not undergo before step d) any surface preparation treatment.

31. The method of claim 30, wherein the lower layer composition is partially cured using a thermal process during step c) at a temperature ranging from 80 to 120° C., for 1 to 30 minutes.

32. The article of claim 1, wherein the lower and/or upper layer compositions comprise a catalytic system composed of a mixture of itaconic acid and N-cyanoguanidine.

33. An optical article comprising a substrate having at least one main surface coated with an abrasion- and scratch-resistant coating, the abrasion- and scratch-resistant coating comprised of, starting from the substrate, a lower layer and an upper layer that adhere with each other, the upper layer being a layer of a cured upper layer composition and the lower layer being a layer of a cured lower layer composition wherein:

the upper layer composition comprises:

at least one organosilane compound, or a hydrolyzate thereof, of formula:

$R_n Y_m Si(X)_{4-n-m}$  (I)

wherein the R groups are individually monovalent organic groups that are bound to silicon through a carbon atom and that contain at least one epoxy function, the X groups are individually hydrolyzable groups, Y is a monovalent organic group bound to silicon through a carbon atom, n and m being integers such that n=1 or 2 with n+m=1 or 2; and at least one compound, or a hydrolyzate thereof, of formula:

$M(Z)_x$  (II)

wherein M represents a metal or a metalloid, the Z groups are individually hydrolyzable groups and x, equal to or higher than 4, is a metal or metalloid M valence, the ratio:

$$Rs = \frac{\text{theoretical dry matter weight of compounds I in the upper layer composition}}{\text{theoretical dry matter weight of compounds II in the upper layer composition}}$$

being lower than or equal to 2.3; and the lower layer composition comprises:

at least one organosilane compound, or a hydrolyzate thereof, of formula:

$R'_{n'} Y'_{m'} Si(X)_{4-n'-m'}$  (III)

wherein the R' groups are individually monovalent organic groups that are bound to silicon through a carbon atom and that contain at least one epoxy function, the X' groups are individually hydrolyzable groups, Y' is a monovalent organic group bound to silicon through a carbon atom, n' and m' being integers such that n'=1 or 2 with n'+m'=1 or 2, wherein the optical article further comprises an antireflection coating adhered to the upper layer composition.

34. The optical article of claim 33, wherein the lower and/or upper layer compositions comprise a catalytic system composed of aluminum acetylacetonate or composed of a mixture of itaconic acid and N-cyanoguanidine.

* * * * *

UNITED STATES PATENT AND TRADEMARK OFFICE
CERTIFICATE OF CORRECTION

PATENT NO.        : 10,222,511 B2
APPLICATION NO.   : 15/264290
DATED             : March 5, 2019
INVENTOR(S)       : Fabien Berit-Debat et al.

It is certified that error appears in the above-identified patent and that said Letters Patent is hereby corrected as shown below:

On the Title Page

Item (73) Assignee:
Replace "ESSILOR INTERNATIONAL (COMPAGNIE GENERALE D'OPTIQUE)" with
-- ESSILOR INTERNATIONAL --.

Signed and Sealed this
Sixteenth Day of July, 2019

Andrei Iancu
*Director of the United States Patent and Trademark Office*